United States Patent
Ehrne et al.

(10) Patent No.: US 8,672,293 B2
(45) Date of Patent: Mar. 18, 2014

(54) VACUUM VALVE

(75) Inventors: Florian Ehrne, Frumsen (CH); Thomas Blecha, Feldkirch (AT)

(73) Assignee: VAT Holding AG, Haag (CH)

( * ) Notice: Subject to any disclaimer, the term of this patent is extended or adjusted under 35 U.S.C. 154(b) by 192 days.

(21) Appl. No.: 13/119,530

(22) PCT Filed: Sep. 21, 2009

(86) PCT No.: PCT/AT2009/000366
§ 371 (c)(1),
(2), (4) Date: Mar. 17, 2011

(87) PCT Pub. No.: WO2010/034046
PCT Pub. Date: Apr. 1, 2010

(65) Prior Publication Data
US 2011/0175011 A1    Jul. 21, 2011

(30) Foreign Application Priority Data
Sep. 29, 2008   (DE) .......................... 10 2008 049 353

(51) Int. Cl.
*F16K 25/00* (2006.01)
*F16K 3/00* (2006.01)

(52) U.S. Cl.
USPC ............................ 251/193; 251/158; 251/326

(58) Field of Classification Search
USPC .......................... 251/158, 326, 193, 195–202
See application file for complete search history.

(56) References Cited

U.S. PATENT DOCUMENTS

| | | | |
|---|---|---|---|
| 4,721,282 A * | 1/1988 | Shawver et al. | ................ 251/62 |
| 5,120,019 A | 6/1992 | Davis, Jr. | |
| 5,415,376 A | 5/1995 | Ito | |
| 5,641,149 A | 6/1997 | Ito | |
| 5,755,426 A | 5/1998 | Boesch | |

(Continued)

FOREIGN PATENT DOCUMENTS

| | | |
|---|---|---|
| CN | 2675978 Y | 2/2005 |
| CN | 1749609 A | 3/2006 |

(Continued)

*Primary Examiner* — John K Fristoe, Jr.
*Assistant Examiner* — Hailey K Do
(74) *Attorney, Agent, or Firm* — Volpe and Koenig, P.C.

(57) ABSTRACT

A vacuum valve including a wall (1) having a valve opening (2) surrounded by a valve seat (4), at least one valve plate (5), which is disposed in a vacuum region of the vacuum valve and can be moved from an open position in a longitudinal direction (6) into an intermediate position, and from the intermediate position in a transverse direction (7) perpendicular to the longitudinal direction (6) into a closed position. At least one valve rod (12), which carries the valve plate (5), is led through the vacuum region of the vacuum valve and can be displaced relative to the wall (1) in the longitudinal direction (6) located parallel to the longitudinal axis (14) of the valve rod (12), and also in the transverse direction (7). Longitudinal and transverse drive devices (15, 15', 16, 16') are disposed outside of the vacuum region of the vacuum valve, and the drive devices can displace the valve rod (12) in the longitudinal direction (6) and in the transverse direction (7) in order to adjust the valve plate (5). A bearing unit (17, 17') is provided, which is located outside of the vacuum region of the vacuum valve and rigidly connected to the wall (1) and by which a guide unit (20, 20') that displaceably guides the valve rod (12) in the longitudinal direction (6) is guided displaceably in the transverse direction (7).

11 Claims, 20 Drawing Sheets

(56) References Cited

U.S. PATENT DOCUMENTS

| | | |
|---|---|---|
| 5,934,646 A | 8/1999 | Tamura et al. |
| 6,056,267 A | 5/2000 | Schneider |
| 6,095,741 A | 8/2000 | Kroeker et al. |
| 6,237,892 B1 | 5/2001 | Ito |
| 6,416,037 B1 | 7/2002 | Geiser |
| 6,431,518 B1 | 8/2002 | Geiser |
| 6,619,618 B2 | 9/2003 | Ishigaki et al. |
| 6,899,316 B2 * | 5/2005 | Duelli ............................ 251/158 |
| 6,913,243 B1 | 7/2005 | Tomasch |
| 6,966,538 B2 | 11/2005 | Hayashi et al. |
| 7,021,882 B2 * | 4/2006 | Otaguro ....................... 414/217.1 |
| 2005/0045846 A1 * | 3/2005 | Iwabuchi ....................... 251/193 |
| 2005/0139799 A1 | 6/2005 | Tomasch |
| 2006/0049374 A1 | 3/2006 | Ehrne et al. |
| 2007/0272888 A1 | 11/2007 | Tichy |
| 2008/0017822 A1 | 1/2008 | Schoen et al. |

FOREIGN PATENT DOCUMENTS

| | | |
|---|---|---|
| DE | 19746241 | 6/1999 |
| DE | 60030559 | 8/2007 |
| EP | 1182387 | 2/2002 |
| JP | 62020973 | 1/1987 |
| JP | 353678 | 5/1991 |
| JP | 11072167 | 3/1999 |
| JP | 11351419 | 12/1999 |
| JP | 2000028013 | 1/2000 |
| JP | 2003097736 | 4/2003 |
| TW | 287075 | 9/2007 |

* cited by examiner

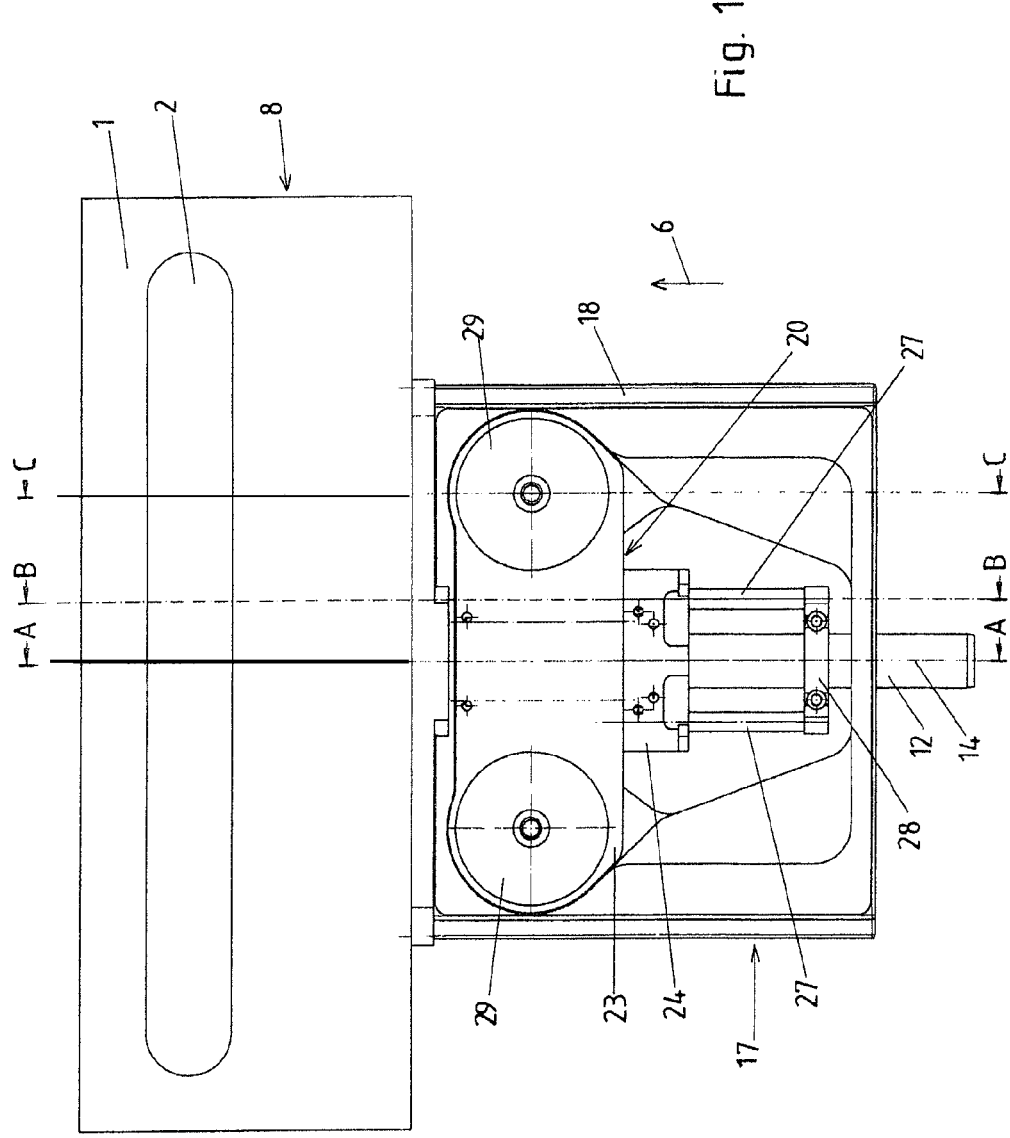

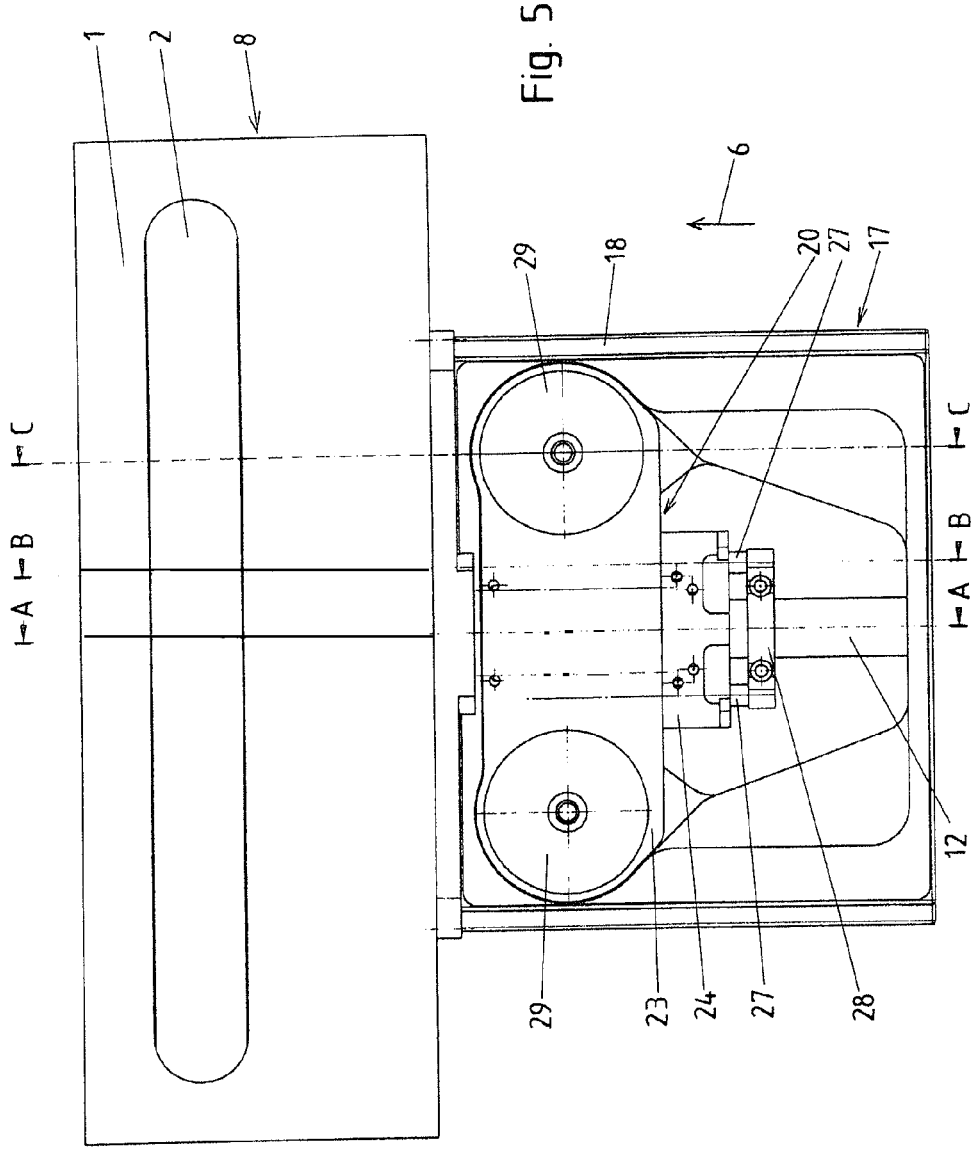

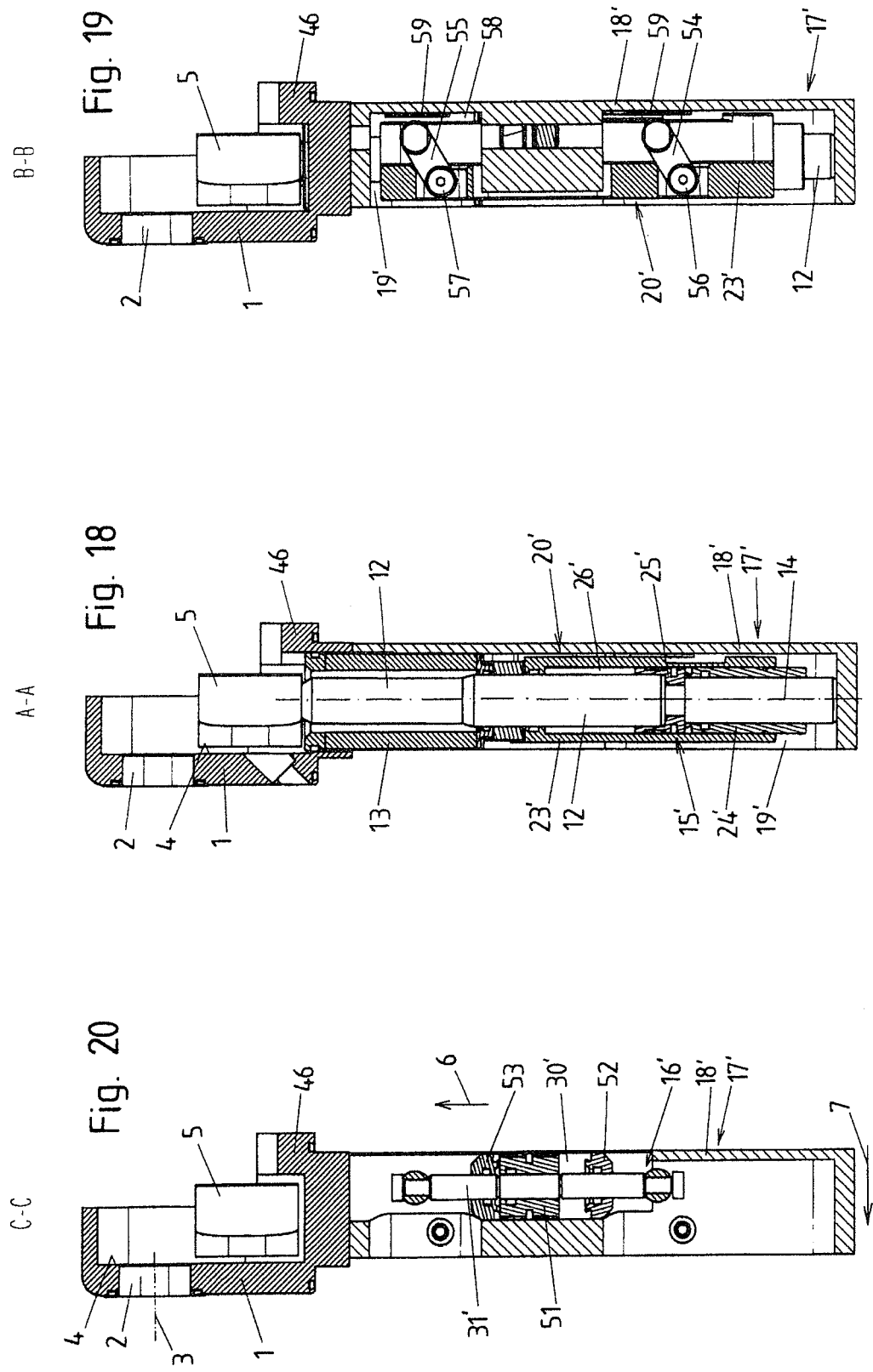

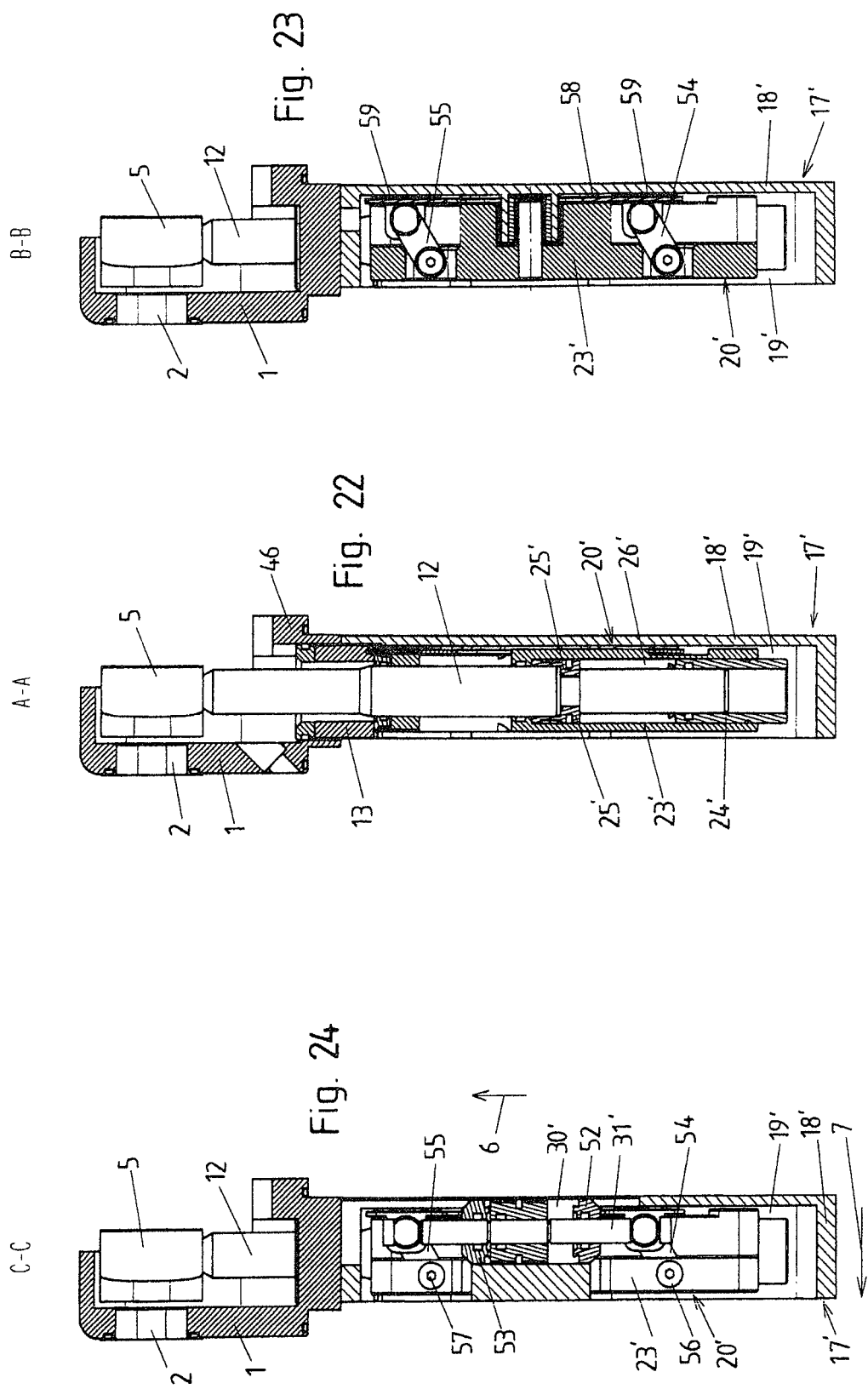

VACUUM VALVE

BACKGROUND

The invention relates to a vacuum valve comprising:
a wall with a valve opening that is surrounded by a valve seat,
at least one valve plate arranged in a vacuum region of the vacuum valve,
wherein this valve plate can be moved from an open position in which it opens up the valve opening in a longitudinal direction into an intermediate position in which it covers the valve opening but is lifted from the valve seat and from its intermediate position in a transverse direction at a right angle to the longitudinal direction into a closed position in which it is pressed onto the valve seat and closes the valve opening,
at least one valve rod that carries the valve plate and is led out from the vacuum region of the vacuum valve and can be displaced relative to the wall in the longitudinal direction lying parallel to the longitudinal axis of the valve rod and also can be displaced parallel to the wall in the transverse direction,
a longitudinal drive device is arranged outside of the vacuum region of the vacuum valve by which the valve rod can be displaced in the longitudinal direction for adjusting the valve plate between its open position and its intermediate position, and
a transverse drive device is arranged outside of the vacuum region of the vacuum valve and by which the valve rod can be displaced in the transverse direction for adjusting the valve plate between its intermediate position and its closed position.

Such vacuum valves are also designated as L-valves that are known in different constructions. In a common construction not according to the class, the valve rod is supported so that it can pivot about an axis at a right angle to the longitudinal direction and at a right angle to the transverse direction, in order to allow the adjustment of the valve plate from its intermediate position into its closed position and back again. Such a construction follows, for example, from U.S. Pat. No. 6,431,518 B1. The cylinder of the piston-cylinder unit forming the longitudinal drive can be pivoted together with the valve rod and another piston-cylinder unit is used for pivoting the valve rod and the cylinder. A similar device is also known from U.S. Pat. No. 6,416,037 B1. A common construction also provides that the tilting of the valve rod is performed by means of a connecting-link guide by the same piston-cylinder unit generating the longitudinal drive, as emerges, for example, from U.S. Pat. No. 6,966,538 B2, U.S. Pat. No. 5,641,149 A, U.S. Pat. No. 6,237,892 B1, and U.S. Pat. No. 6,619,618 B2.

One disadvantage of these known L-valves in which the adjustment of the valve plate in the transverse direction is performed by a tilting of the valve rod consists in that the adjustment of the valve plate is not performed exactly and in parallel, but instead only approximately in the transverse direction, which leads to elevated loading of the seal that seals the valve plate relative to the valve seat.

Furthermore, so-called J-valves are also known in which the striking of the valve plate on the valve seat is performed at a very oblique angle to the transverse direction.

Furthermore, L-valves have become known in which the adjustment of the valve plate from its intermediate position into its closed position is performed by a straight-line displacement in the transverse direction. For example, from U.S. 2007/0272888 A1 of the applicant, a vacuum valve emerges in which the valve plate can be displaced in the transverse direction relative to a carrier unit by means of piston-cylinder units. The carrier unit is arranged on valve rods that can be displaced in the longitudinal direction by means of additional piston-cylinder units. In addition to a construction as a vacuum valve, this device could also be constructed as gates in which the valve plate closes an opening in a wall of a vacuum chamber from the outside and here can lie outside of the vacuum region. A similar vacuum valve with piston-cylinder units for the longitudinal displacement of valve rods that carry a carrier unit and for the transverse displacement of a valve plate relative to the carrier unit is known from U.S. Pat. No. 6,899,316 A.

From U.S. 2008/0017822 A1, an L-valve is known in which the valve plate is attached to a valve rod that is guided so that it can be displaced in the longitudinal direction and can be adjusted in the longitudinal direction by means of a piston-cylinder unit. Through the use of a guide device that is formed in one embodiment by a linear guide, this piston-cylinder unit is guided so that it can be displaced in the transverse direction, wherein the piston rod can also be displaced in the transverse direction relative to the wall having the valve opening. For adjusting the valve plate from its intermediate position into its closed position, a piston-cylinder unit integrated in the valve plate is used. In another embodiment, the transverse drive device is formed by a piston-cylinder unit arranged outside of the vacuum region, with this piston-cylinder unit acting on the cylinder of the piston-cylinder unit of the longitudinal drive device. It is constructed so that such a construction is suitable, in particular, for applications in which the valve plate is loaded only by a differential pressure that presses the valve plate onto the valve seat. In this case, a closing force pressing the valve plate onto the valve seat does not have to be applied. The transmission of a larger closing force would be problematic with the transverse guide emerging from this publication.

SUMMARY

The objective of the invention is to disclose an improved vacuum valve of the type named above that is also suitable for applications in which differential pressures acting on the valve plate in two directions can occur. This is possible by a vacuum valve with the features of the invention.

For the vacuum valve of the invention, the valve rod can be displaced, on one hand, in the longitudinal direction lying parallel to its longitudinal axis relative to the wall having the valve opening and, on the other hand, in the transverse direction at a right angle to the longitudinal axis parallel to the wall having the valve opening. The longitudinal drive device and the transverse drive device for the valve rod lie outside of the vacuum region of the vacuum valve. Furthermore, a bearing unit is arranged outside of the vacuum region of the vacuum valve. A guide unit that guides the valve rod so that it can be displaced in the longitudinal direction is guided by this bearing unit so that it can be displaced in the transverse direction, wherein the guide unit thus likewise lies outside of the vacuum region of the vacuum valve. The guide unit can be displaced as a whole, i.e., across its entire extent in the transverse direction relative to the bearing unit.

Through the use of the bearing unit that is arranged outside of the vacuum region and is connected rigidly to the wall and is guided in a displaceable manner by the guide unit, an improved force transmission to the valve plate can be achieved, making possible the construction of such an L-valve in which both the longitudinal drive device and also the transverse drive device lie outside of the vacuum region for absorbing differential pressure acting on the valve plate in two directions. Through the arrangement of both the longitudinal drive device and also the transverse drive device outside of the vacuum region, and advantageous and service-friendly construction can be achieved.

Advantageously, the bearing unit that supports the guide unit so that it can be displaced in a straight line in the transverse direction has sections lying on both sides of the guide unit with respect to the longitudinal direction. Here, the guide unit is advantageously arranged at least partially, advantageously completely, in a receptacle space of the bearing unit and is guided so that it can be displaced in this space by the bearing unit. The guide unit represents a sled guided by the bearing unit in a straight line in the transverse direction.

Advantageously, the longitudinal drive device has at least one piston-cylinder unit. The cylinder recess in which the piston is arranged can be constructed advantageously in the guide unit. It is also possible, however, to provide a cylinder connected rigidly to the guide unit. The valve rod of the piston of the piston-cylinder unit can directly form the valve rod guided in the vacuum region and carrying the valve plate or a separate piston rod connected to the valve rod could be provided.

The force to be applied by the transverse drive device for the displacement of the valve rod in the transverse direction acts on the valve rod advantageously via the guide unit, wherein this action can be performed directly or by at least one gear element. The transverse drive device could be constructed, for example, in the form of at least one piston-cylinder unit.

In one possible embodiment of the invention, the transverse drive device has at least one drive part that can be displaced in the longitudinal direction and is connected by at least one gear element to the guide unit that transforms the movement of the drive part performed in the longitudinal direction into a movement of the guide unit in the transverse direction. Advantageously, here, the drive part or each drive part on the sides of the drive part opposite the longitudinal direction is connected to the guide unit by a corresponding gear element, in order to achieve a parallel displacement of the guide unit in the transverse direction. In other words, the gear elements form a parallel guide for the guide unit. The gear elements could here be, for example, pivoting connecting rods that are connected to the drive part and the guide unit and together form a parallelogram guide. Here, the actuators of the transverse drive device that have the drive parts could be guided as a whole displaceable in the longitudinal direction relative to the carrier unit and could be supported on this carrier unit, for example, by a plate-shaped displacement part that can be displaced relative to the bearing unit and to which they are attached. In this way, a high force can be applied relative to a tilting of the valve rod opposite the longitudinal direction, in order to press the valve plate onto the valve seat in its closed position with a correspondingly high closing force.

One advantageous embodiment of the invention provides that the valve rod projects from the guide unit both in the open position and also in the intermediate position and closed position on its side facing away from the valve plate and is supported in the closed position of the valve plate on a transverse stop that is arranged on the bearing unit and acts against a displacement of the valve rod in the transverse direction. Here, the valve rod or a part connected to this rod is supported on the side of the valve rod or this part on the transverse stop lying closer to the valve seat with respect to the transverse direction. The transverse stop of the bearing unit and also the valve seat on which the valve plate contacts thus form, in the closed position of the valve plate, two supports for the unit formed from the valve rod and the valve plate. Thus, a force keeping the alignment of the valve rod in the closed position of the valve plate parallel to the longitudinal direction can be transmitted from the valve rod via the bearing unit onto the wall having the valve opening.

BRIEF DESCRIPTION OF THE DRAWINGS

Additional advantages and details of the invention are explained below with reference to the accompanying drawing. Shown in this drawing are:

FIG. 1 a view of a vacuum valve according to a first embodiment of the invention in the open position of the valve plate, FIGS. 2 to 4 section views along the lines AA, BB, and CC from FIG. 1, FIG. 5 a view corresponding to FIG. 1, but in the intermediate position of the valve plate, FIGS. 6 to 8 section views along the lines AA, BB, and CC from FIG. 5, FIG. 9 a view corresponding to FIG. 1, but in the closed position of the valve plate, FIGS. 10 to 12 section views along the lines AA, BB, and CC from FIG. 9, FIG. 13 a perspective view of the drive of the vacuum valve with the valve rod and the valve plate attached to this rod corresponding to the first embodiment of the invention, FIG. 14 a perspective view corresponding to FIG. 13, parts of the valve shown pulled apart from each other, FIG. 15 a view of another variant of a vacuum valve corresponding to the first embodiment of the invention, FIG. 16 a section view along the line AA from FIG. 15, FIG. 17 a view of a vacuum valve according to a second embodiment of the invention in the open position of the valve plate (the bellows of the bellows bushing of the valve rod is left out), FIGS. 18 to 20 section views along the lines AA, BB, and CC from FIG. 17 (with the bellows of the bellows bushing of the valve rod), FIG. 21 a view of the valve from FIG. 17 in the intermediate position of the valve plate, FIGS. 22 to 24 section views along the lines AA, BB, and CC in FIG. 21, FIG. 25 a view of the valve from FIG. 17 in the closed position of the valve plate, FIGS. 26 to 28 section views along the lines AA, BB, and CC in FIG. 25, FIG. 29 a bottom view of the vacuum valve according to the second embodiment, FIG. 30 a perspective view of the vacuum valve according to the second embodiment, FIG. 31 a perspective view from a viewing direction corresponding to FIG. 30, parts of the vacuum valve shown pulled apart from each other, FIG. 32 a view corresponding to FIG. 31, but from a different viewing direction, FIG. 33 a view of the valve drive with the valve rod (without the bellows of the bellows bushing), partially cut open, FIG. 34 a schematic diagram of the valve in a state installed in a vacuum chamber.

DETAILED DESCRIPTION OF THE PREFERRED EMBODIMENTS

Figure 4:
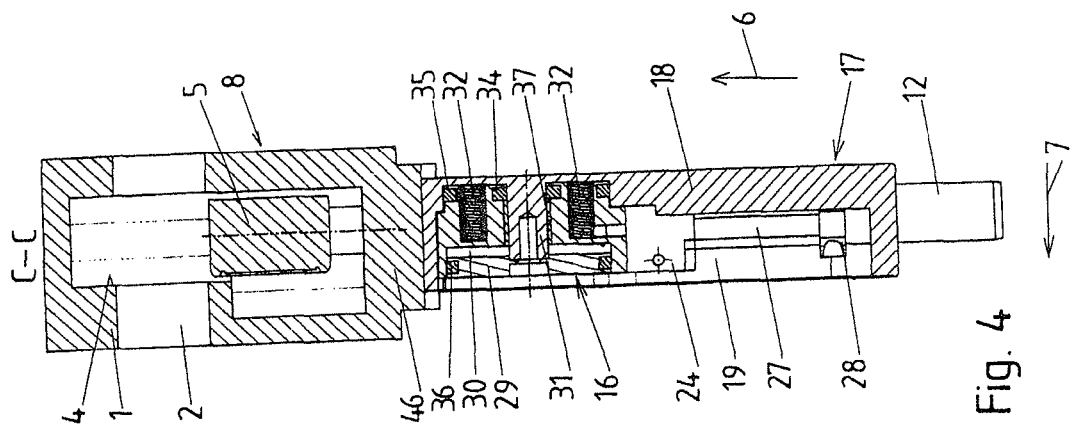
Figure 3:
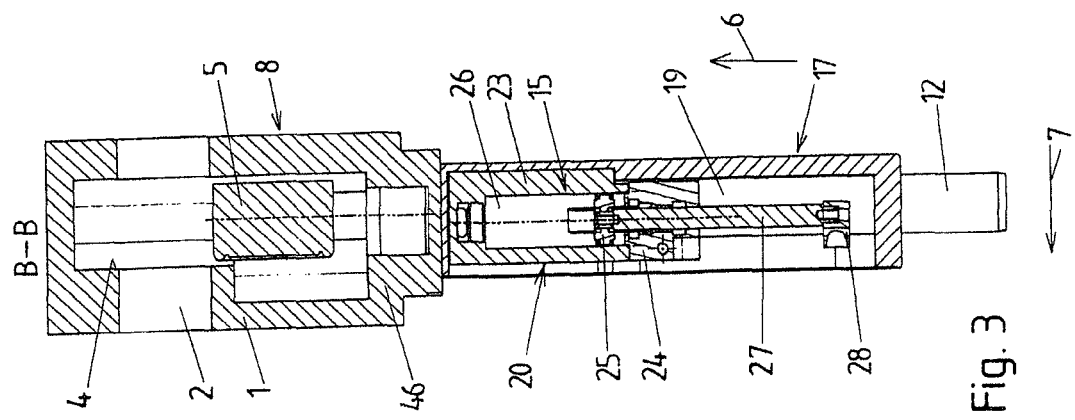
Figure 2:
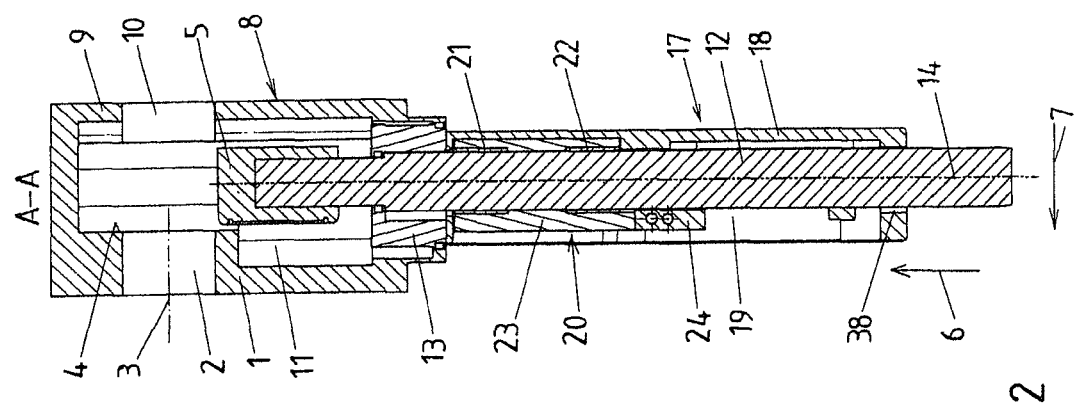

The figures are shown simplified, in part. For example, among other things, connection flanges are shown simplified, e.g., screw holes are left out, in part, and connection screws are not shown, in part.

A first embodiment of the invention is explained below with reference to FIGS. 1 to 14. The vacuum valve comprises a wall 1 with a valve opening 2 that has an axis 3 and is surrounded by a valve seat 4 that is formed in this embodiment by a sealing face. For the vacuum-tight closing of the valve opening 2 in a closed state of the vacuum valve (cf. FIGS. 9 to 12), a valve plate 5 is provided. In the opened state of the vacuum valve (cf. FIGS. 1 to 4), the valve plate 5 opens up the valve opening 2, wherein it is advantageously arranged completely next to the valve opening 2 with respect to the direction of the axis 3 of the valve opening 2. Starting from this open position of the valve plate 5, the valve plate 5 can be displaced initially in a longitudinal direction 6 for closing the vacuum valve until it covers the valve opening 2 (viewed in the direction of the axis 3), but here is still lifted from the valve seat 4. This intermediate position of the valve plate 5 is shown in FIGS. 5 to 8. The displacement of the valve plate from its open position into its intermediate position is performed in a straight line in the longitudinal direction 6 across the entire adjustment path. Furthermore, the valve plate is displaced, starting from its intermediate position, in a transverse direction 7 that is at a right angle to the longitudinal direction and lies parallel to the axis 3 in the direction toward the valve seat 4 and pressed on the valve seat 4 for sealing the valve opening 2. In this closed position of the valve plate (cf. FIGS. 9 to 12), the vacuum valve is closed. The displacement from the intermediate position into the closed position is performed in a straight line in the transverse direction 7 across the entire adjustment path.

In the closed position, an elastic sealing ring arranged on the valve plate 5 is pressed onto the sealing face forming the valve seat 4. The opening of the vacuum valve is performed in the reverse sequence, that is, from the closed position of the valve plate into its intermediate position and furthermore into its open position.

The valve plate 5 arranged in a vacuum region (=region that can be evacuated) of the vacuum valve is attached to a valve rod 12 that is guided out from the vacuum region of the vacuum valve by a bellows bushing, i.e., a section of the valve rod on which the valve plate 5 is attached is located in the vacuum region and another section of the valve rod 12 is located outside of the vacuum region. The bellows bushing is formed by a bellows 13 shown only schematically in the figures, for example, a folded bellows or membrane bellows that is connected, on one hand, vacuum tight to the valve rod 12 and, on the other hand, vacuum tight to a wall 46 that is connected rigidly to the wall 1 and is at an angle, advantageously at a right angle, to the wall 1 and, indeed, in the region of an opening through the wall 46 through which the valve rod 12 projects. The valve plate 5 could be connected, as shown, rigidly to the valve rod 12 or this connection could have elasticity, in order to allow a certain amount of adaptation of the valve plate 5 to the valve seat 4 in the closed position of the valve plate 5. Such elastic connections between the valve plate 5 and the valve rod 4 are known.

The longitudinal axis 14 of the valve rod 12 lies parallel to the longitudinal direction 6. For adjusting the valve plate 5 between its open position and its intermediate position, the valve rod 12 can be displaced in the longitudinal direction 6 relative to the wall 1. For adjusting the valve plate 5 between its closed position and its intermediate position, the valve rod 12 can be displaced in the transverse direction 7 parallel to the wall 1. Instead of a bellows bushing for leading the valve rod from the vacuum region, a disk bushing could also be provided. This could have a disk part that has a passage opening through which the valve rod is guided sealed by a seal. The valve rod 12 thus can be displaced in the longitudinal direction 6 relative to this disk part. The disk part itself is supported so that it can be displaced relative to the wall 46 in the transverse direction 7, wherein it is sealed relative to the wall 46 by a seal. The disk part thus forms a kind of sled that is sealed relative to the wall 46 and can be displaced in the transverse direction 7. Such disk bushings that allow displacement in two directions, especially orthogonal relative to each other, are known.

For the opening and closing of the vacuum valve, a valve drive is used that has a longitudinal drive device 15 arranged outside of the vacuum region and by which the valve rod 12 can be displaced in the longitudinal direction and a transverse drive device 16 similarly arranged outside of the vacuum region and by which the valve rod can be displaced in the transverse direction.

In the illustrated embodiment, the wall 1 forms a part of a valve housing 8 that also has a wall 9 with another opening 10 opposite the wall 1 in the embodiment. The valve opening 2 and the opening 10 are part of a passage channel opened up in the opened state of the valve by the valve housing 8 that runs in a straight line in this embodiment. The valve plate 5 is held in the inner space 11 of the valve housing 8 that represents a vacuum region of the vacuum valve.

Figure 34:
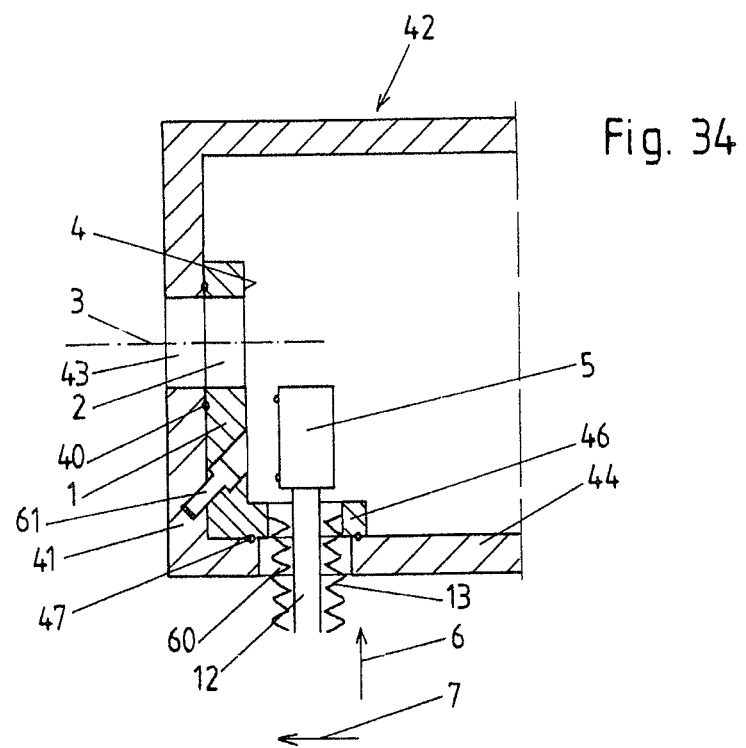

Instead, the wall 1 could also be part of a vacuum chamber (as explained farther below with reference to FIGS. 15 and 16). Furthermore, the vacuum valve could form a kind of insert in which the wall 1 is inserted into the vacuum region of a vacuum chamber. Refer to the schematic diagram in FIG. 34, which is described farther below in connection with the second embodiment.

What now follows is a more precise description of the displaceable bearing of the valve rod 12 in the longitudinal and transverse directions 6, 7, as well as the longitudinal and transverse drive devices 15, 16:

Outside of the vacuum region of the vacuum valve, a bearing unit 17 is connected rigidly to the wall 1. The bearing unit 17 comprises, in the illustrated embodiment, a drive housing 18 that is connected rigidly to the wall 1 or to the valve housing 8 having the wall 1, wherein this drive housing has a receptacle space 19. In the receptacle space 19 there is a guide unit 20 that is guided in a displaceable manner in the receptacle space 19 in a straight line in the transverse direction 7. The valve rod 12 is guided, in turn, in a displaceable manner in the longitudinal direction 6 by the guide unit 20. In this way, a base body 23 of the guide unit 20 has a passage channel that is passed through by the valve rod 12 and in which the valve rod 12 is guided in a displaceable manner by guide bushings 21, 22 in the longitudinal direction 6. The displaceable guide of the guide unit 20 relative to the bearing unit 17 is explained in more detail farther below.

The longitudinal drive device 15 comprises, in the illustrated embodiment, two pistons 25 as actuators that are each arranged in a cylindrical recess 26 in the base body 23 of the guide unit 20. The cylindrical recesses 26 are closed by a cylinder cover 24 of the guide unit 20 that is passed through by the piston rods 27 attached to the pistons 25. The piston rods 27 are connected rigidly to the valve rod 12 via a yoke 28, so that, when the pistons 25 are displaced in the cylindrical recesses 26 by a pressure medium, advantageously compressed air, the valve rod 12 is carried along in the longitudinal direction 6. For connection to the valve rod 12, the yoke 28 is, for example, screwed to this rod.

The transverse drive device 16 comprises two pistons 29 as actuators with seals 36 that are arranged in cylindrical recesses 30 constructed in the base body 23 of the guide unit 20. The pistons 29 are fixed on piston rods 31 that are constructed in the illustrated embodiment integrally with the drive housing 18 of the bearing unit 17. In this sense, the pistons 29 represent parts of the bearing unit 17. The piston rods 31 could also be constructed of separate parts of the bearing unit 17 that are connected rigidly to the drive housing 18 of the bearing unit 17.

The pistons 29 are constructed, in the illustrated embodiment, as single-acting pistons. Through pressurization of the space lying on the side of the piston rod 31 between the piston 29 and the drive housing 18, the guide unit 20 and with it the valve rod 12 can be displaced in the transverse direction 7 relative to the bearing unit 17 so that the valve plate 5 is displaced, starting from its closed position, into its intermediate position. For the displacement of the guide unit 20 and with it the valve rod 12 and the valve plate 5 in the reverse direction, in the illustrated embodiment, initially a spring device is used. This comprises a plurality of coil springs 32 acting between the guide unit 20 and the drive housing 18. The coil springs 32 are arranged on a circle surrounding each piston rod 31 (in FIG. 14, the coil springs are shown only for one piston rod 31 for the sake of visibility). Other arrangements of coil springs 32 and/or the use of other springs for the construction of such a spring device is also conceivable and possible.

When the valve plate 5 is in the closed position, a larger differential pressure acting in the sense of pressing the valve plate 5 away from the valve seat 4 does not act on the valve plate 5, so the contact force exerted on the valve plate 5 by the spring device is sufficient for sealing the valve opening 2 on the valve seat 4. This can be the case, for example, when the vacuum valve is provided for sealing between two vacuum chambers and a vacuum process, for example, for the semiconductor industry, is being carried out in one of the chambers.

If a higher contact force of the valve plate 5 on the valve seat 4 is needed, in the case of a larger differential pressure pressing the valve plate 5 away from the valve seat 4, then a pressure space 33 or, in the illustrated embodiment, two such pressure spaces 33, provided between the base body 23 of the guide unit and the drive housing 18 of the bearing unit 17 can be pressurized with a pressure medium, in particular, compressed air. The pressure spaces 33 are sealed by seals 34, 35.

Higher differential pressures that press the valve plate 5 toward or away from the valve seat 4 could occur, for example, in the case of flooding of one of the two vacuum chambers connected by the vacuum valve, e.g., for maintenance purposes.

The coil springs 32 or springs constructed differently could also be eliminated. Instead of springs and/or pressure spaces 33, double-acting pistons 29 could also be provided.

Figure 8:
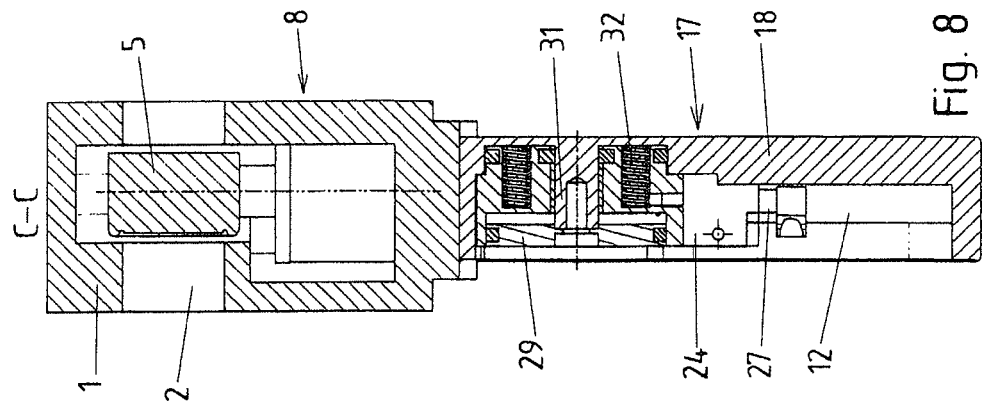
Figure 7:
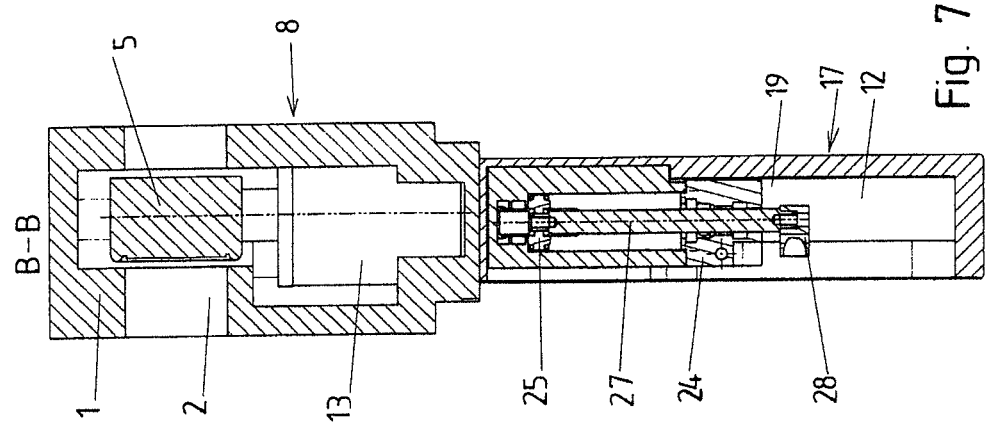
Figure 6:
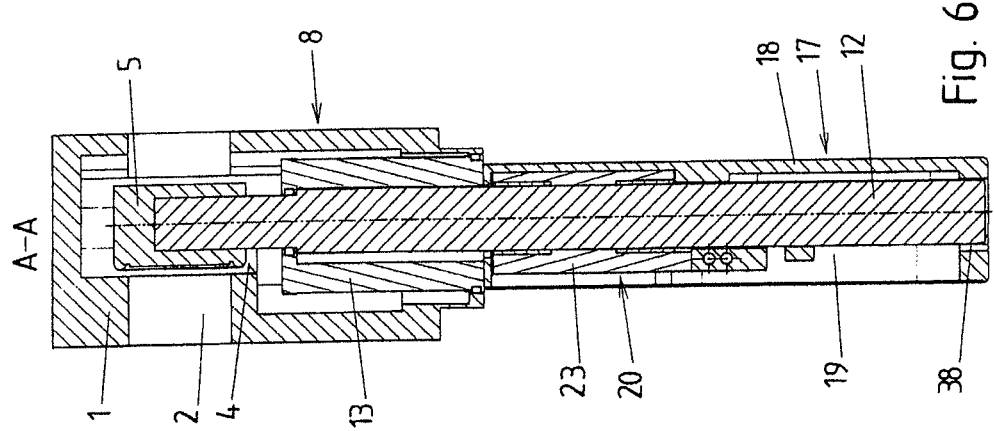
Figure 9:
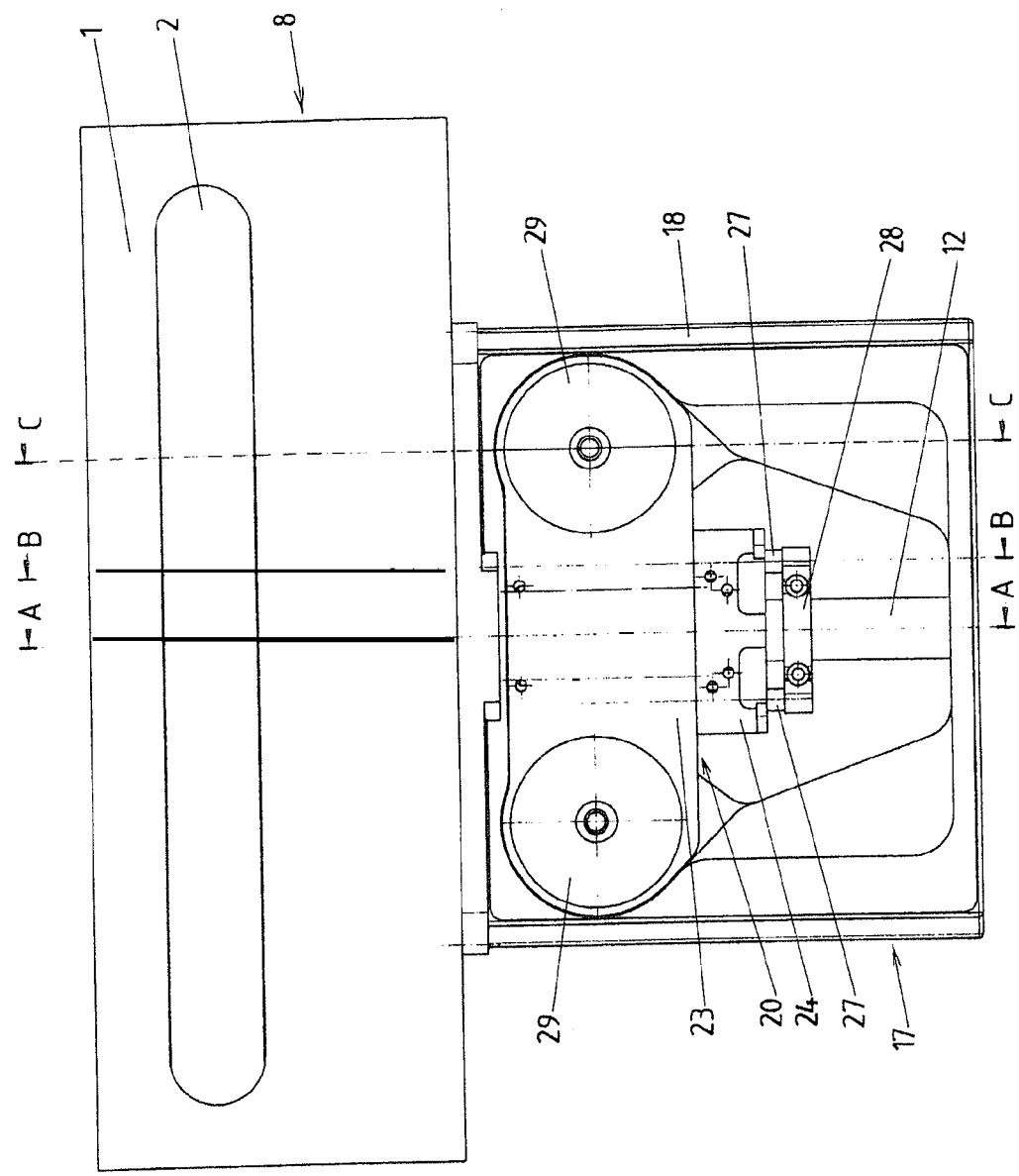
Figure 12:
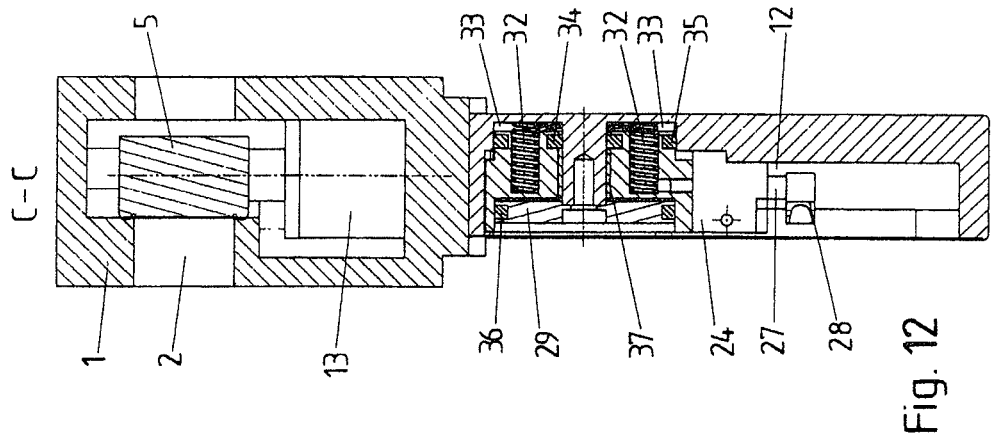
Figure 11:
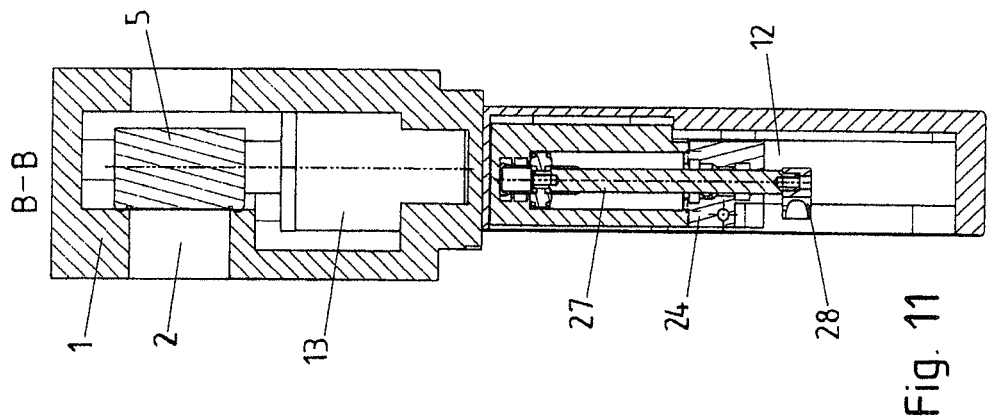
Figure 10:
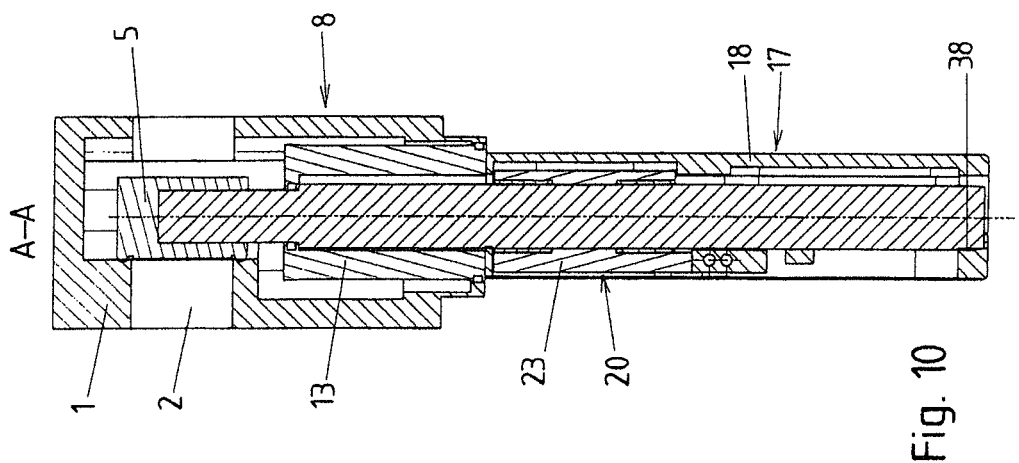
Figure 13:
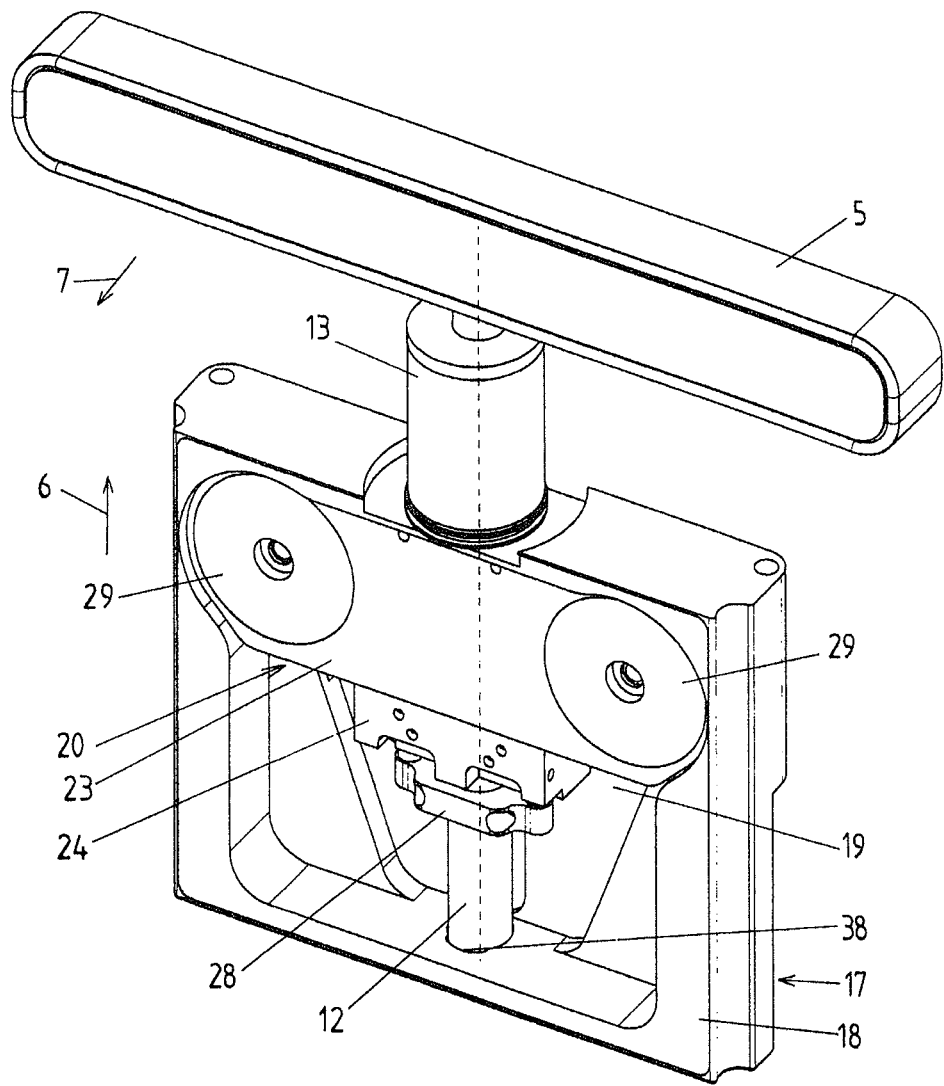
Figure 14:
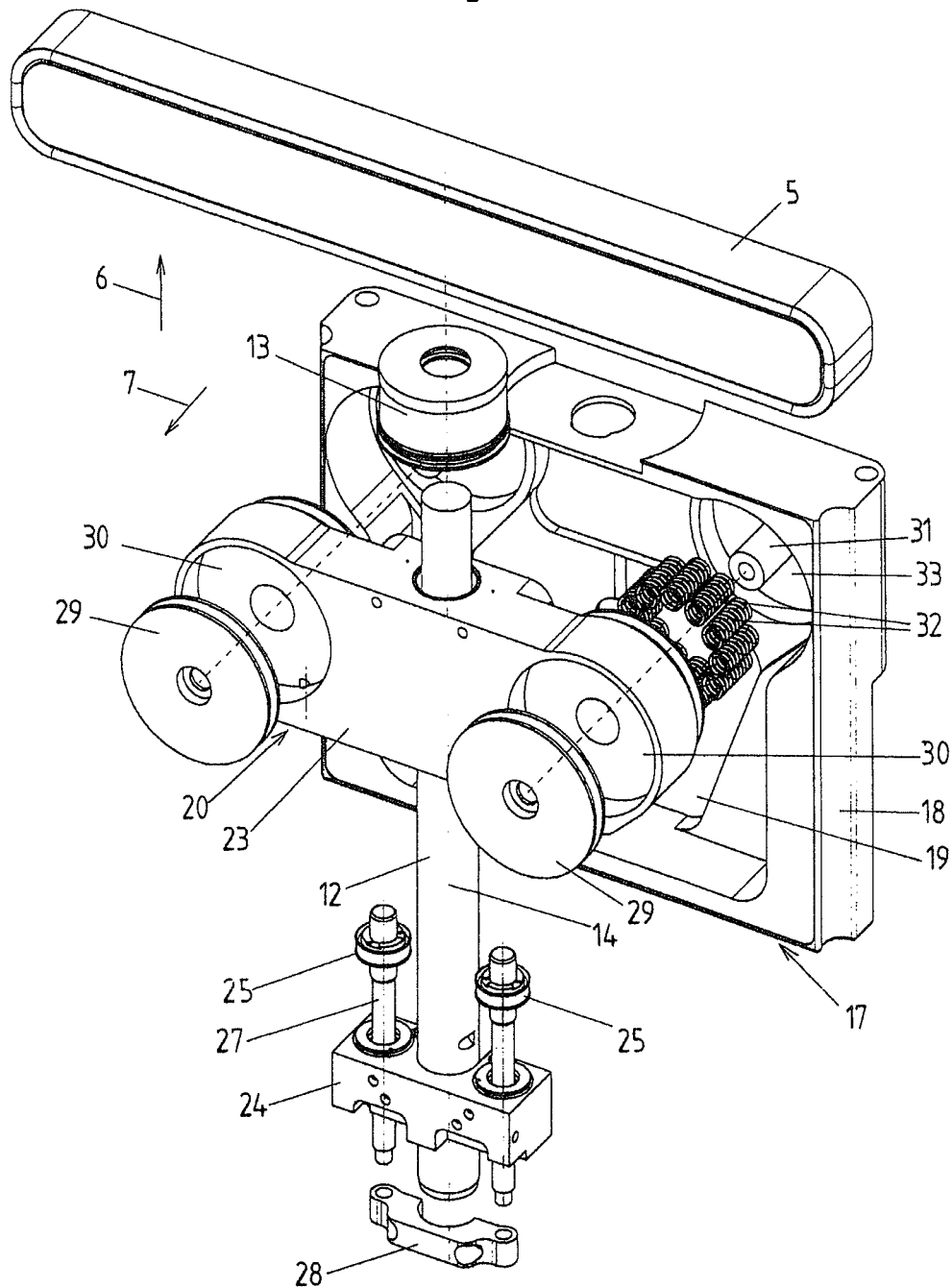

For guiding the guide unit 20 relative to the bearing unit 17 there are guide bushings 37 arranged between the piston rods 31 and the base bodies 23 of the guide units 20 (cf. FIGS. 4, 8, and 12). The seal 34 and/or the seal 35 and/or the seal 36 could also be constructed so that they take on a guide function. In this case, the guide bushings 37 could also be eliminated.

The valve rod 12 that projects from the guide unit 20 on the side of the guide unit 20 facing away from the valve plate 5 interacts, in this section projecting from the guide unit 20 in the closed position of the valve plate 5, with a transverse stop 38 arranged on the drive housing 18 of the bearing unit 17, advantageously as shown in the end region of the valve rod 12. In the open position of the valve plate 5 and the intermediate position of the valve plate 5, the valve rod 12 is spaced apart from the transverse stop 38. When the valve plate 5 moves from the intermediate position into the closed position, the valve rod 12 contacts the transverse stop 38, advantageously at the same time with the contacting of the valve plate 5 on the valve seat 4. Thus, the valve rod 12 is supported on the wall 1 or a part connected rigidly to the wall 1 on both sides of the contact region of the transverse drive device 16 on the valve rod 12, wherein this contact region lies in the region of the displaceable bearing of the valve rod 12 relative to the guide unit 20. Therefore, in a simple way, the required contact force of the valve plate 5 can be transmitted to the valve seat 4, without large tilting forces having to be absorbed by the longitudinal guide of the valve rod 12 and the transverse guide of the guide unit 20.

The longitudinal drive device 15 and/or transverse drive device 16 could also have more or less than the two shown pistons 25 or 29. Instead of the construction of the cylindrical recesses 26 or 30 for the pistons 25 of the longitudinal drive device 15 and/or for the pistons 29 of the transverse drive device 16 as recesses in the base body 23 of the guide unit 20, separate cylinders could also be provided that are connected rigidly to the guide unit. The reverse arrangement of the cylinders and the pistons is also conceivable and possible. For example, the pistons of the longitudinal drive device 15 could be connected rigidly to the guide unit 20 and the cylinders of these pistons could be connected to the valve rod 12 and/or the pistons 29 of the transverse drive device 16 could be connected rigidly to the guide unit 20 and the cylinders for these pistons could be connected rigidly to the bearing unit 17 or could be constructed in the form of cylindrical recesses in the bearing unit 17.

Figure 15:
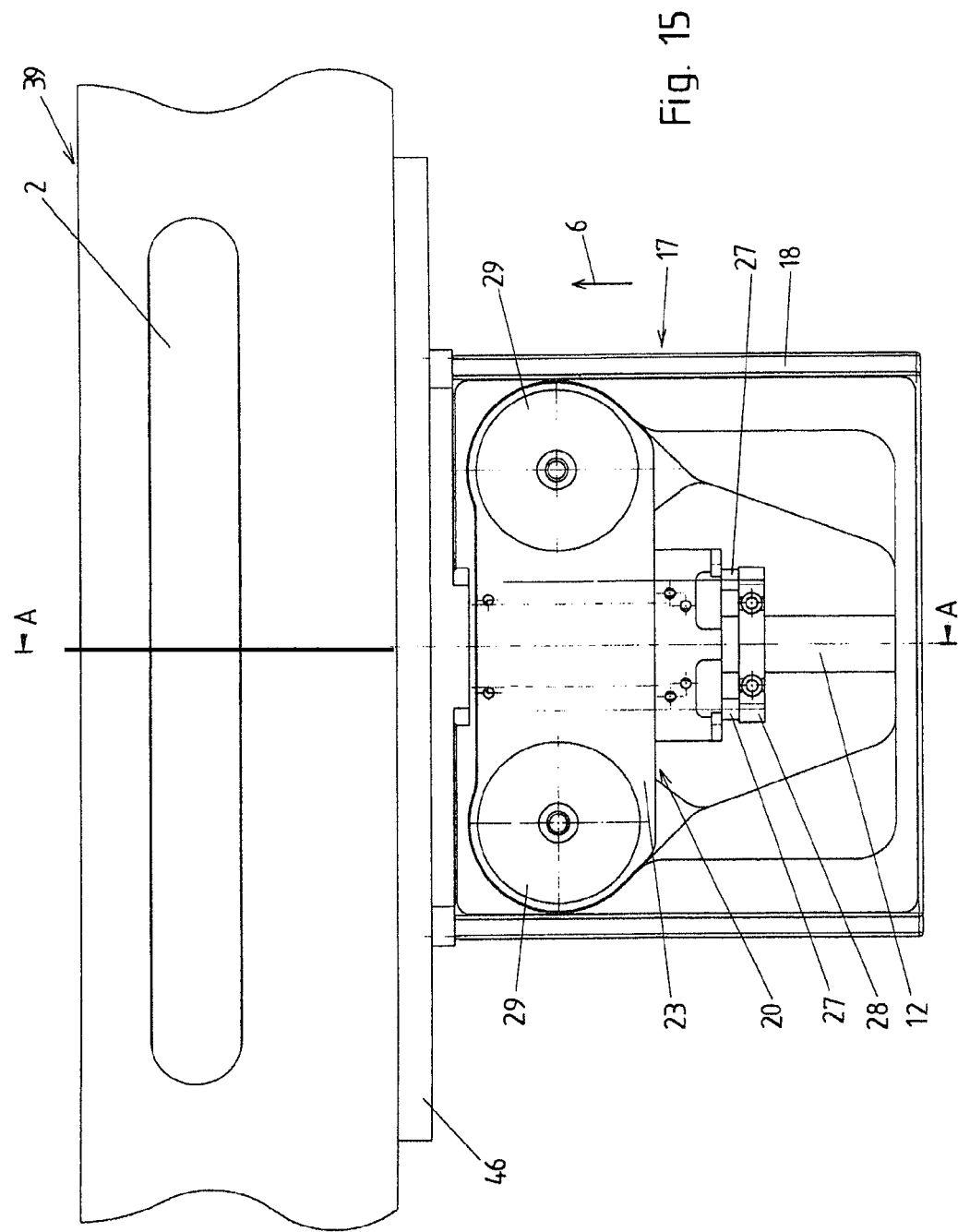
Figure 16:
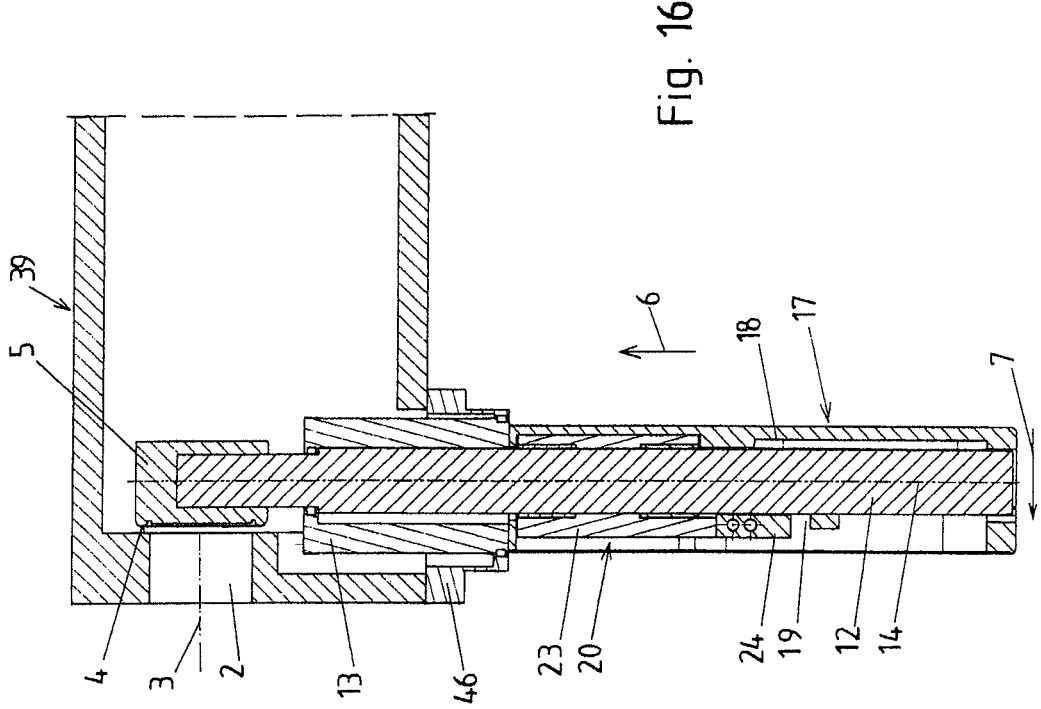
Figure 17:
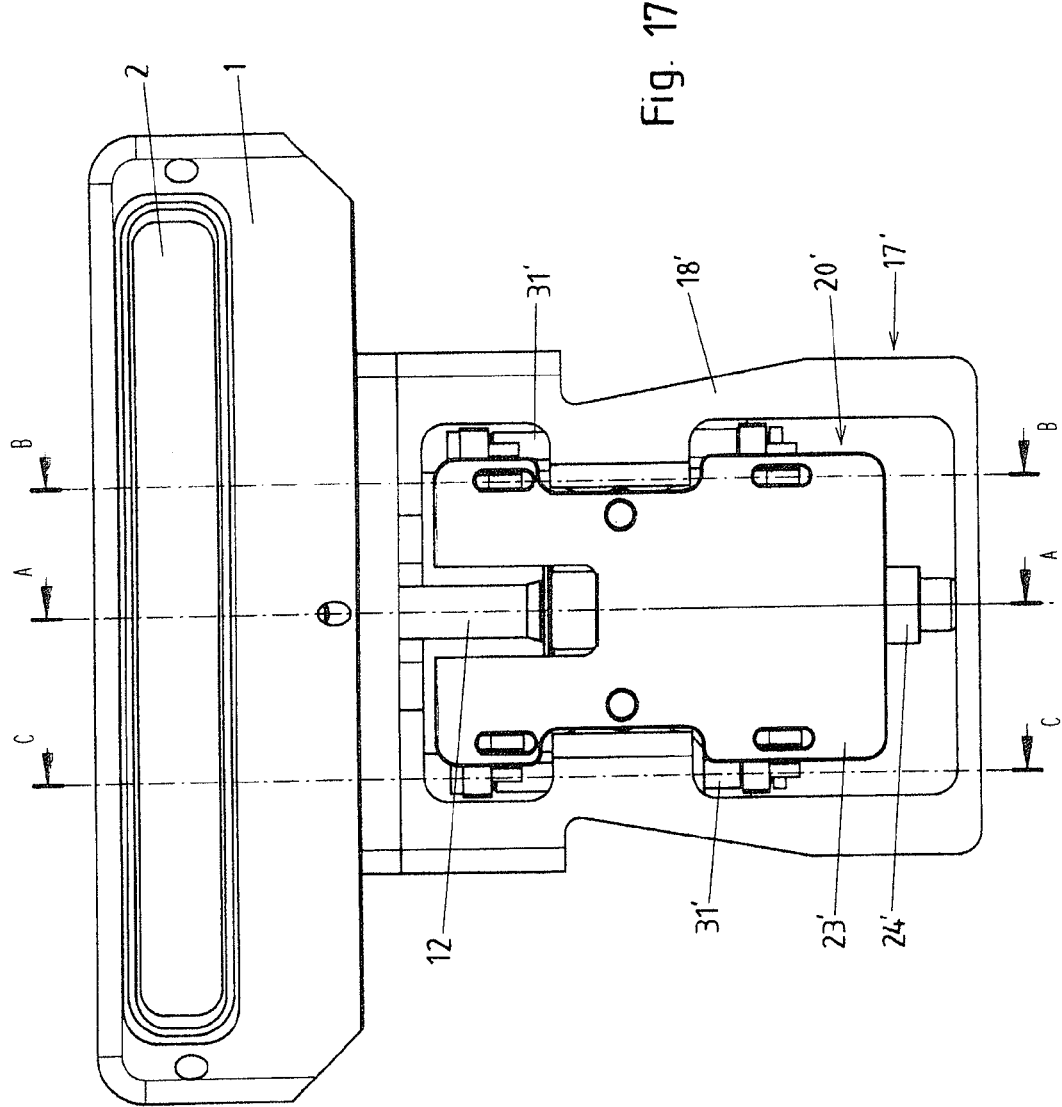
Figure 21:
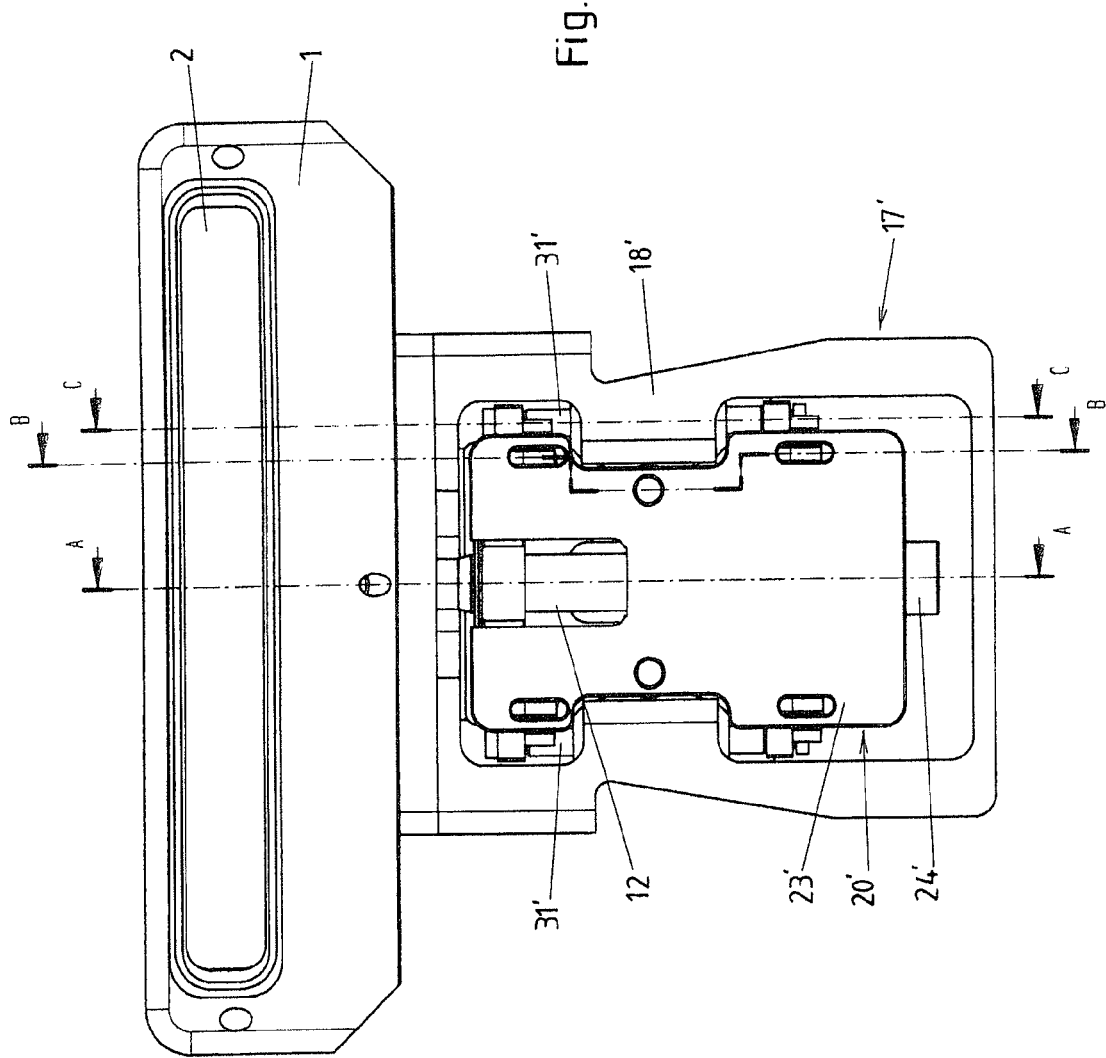
Figure 25:
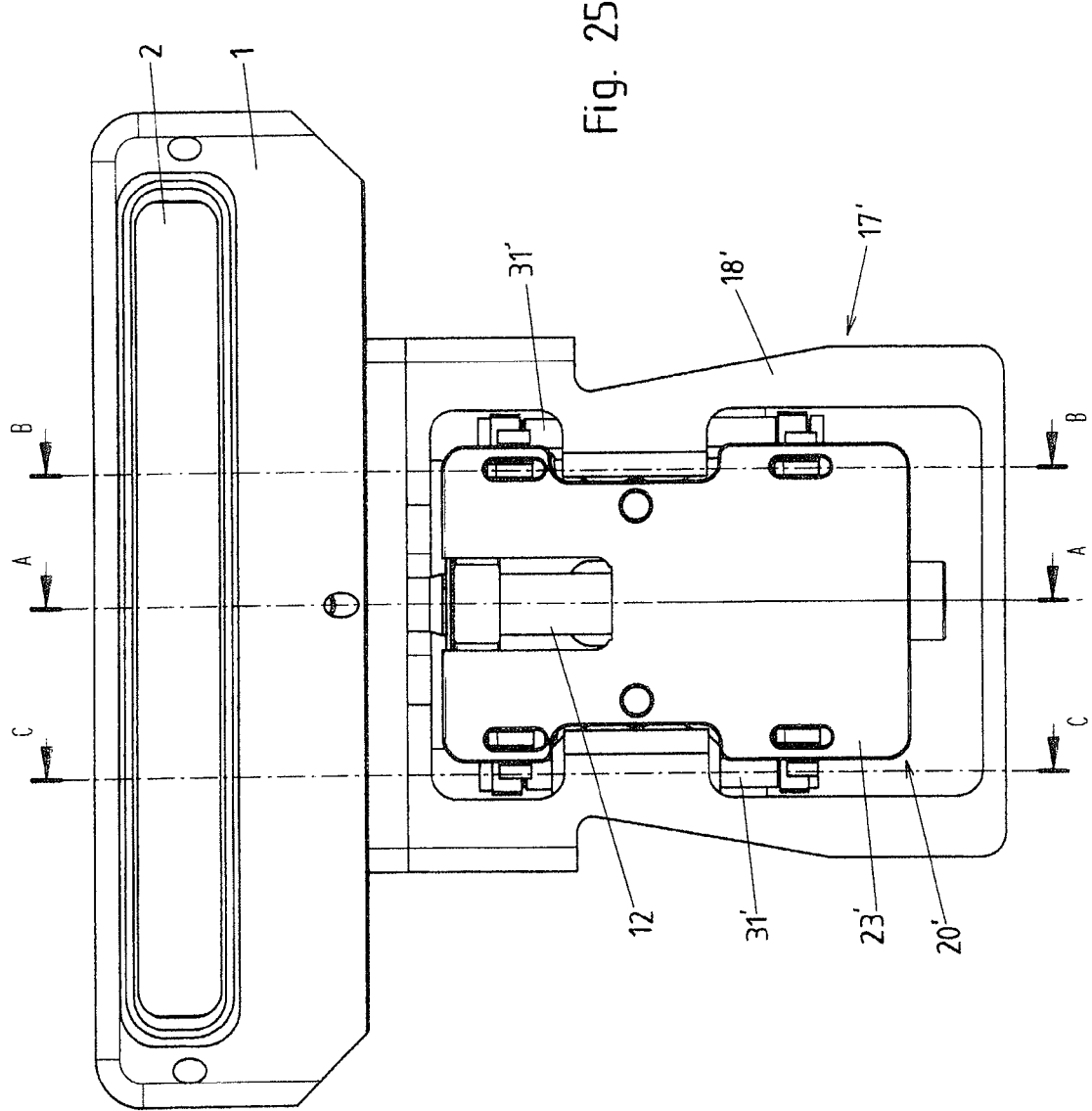
Figure 26:
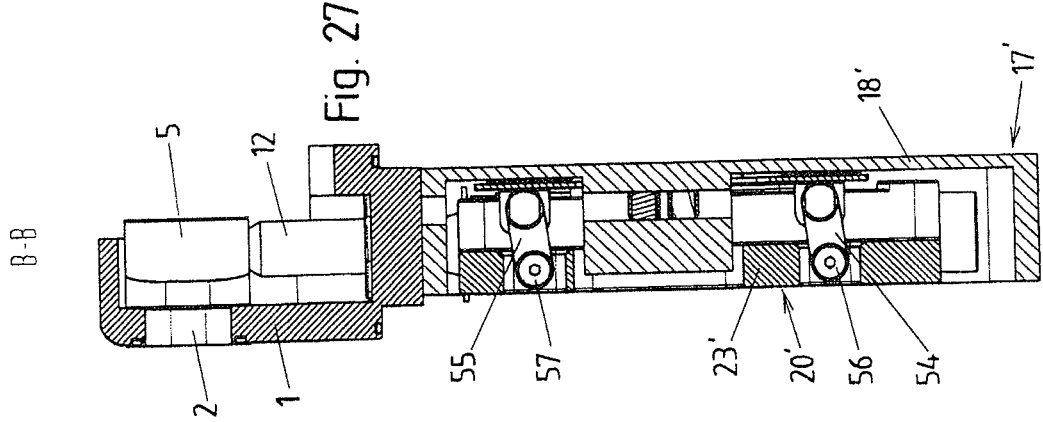
Figure 27:
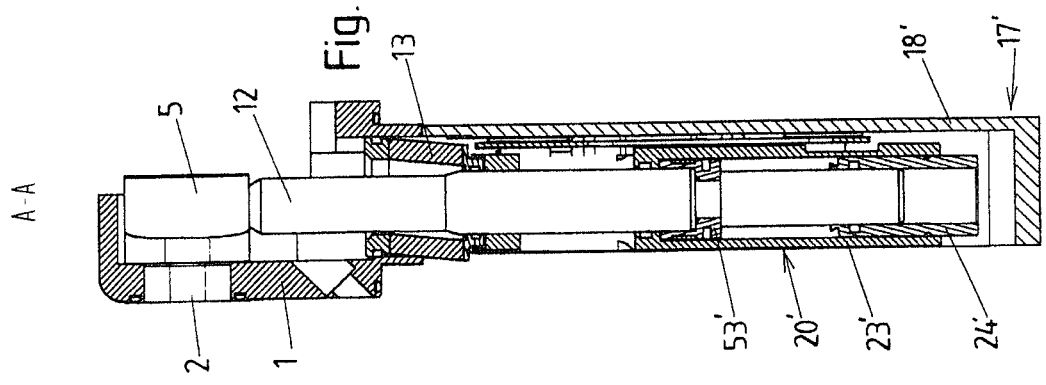
Figure 28:
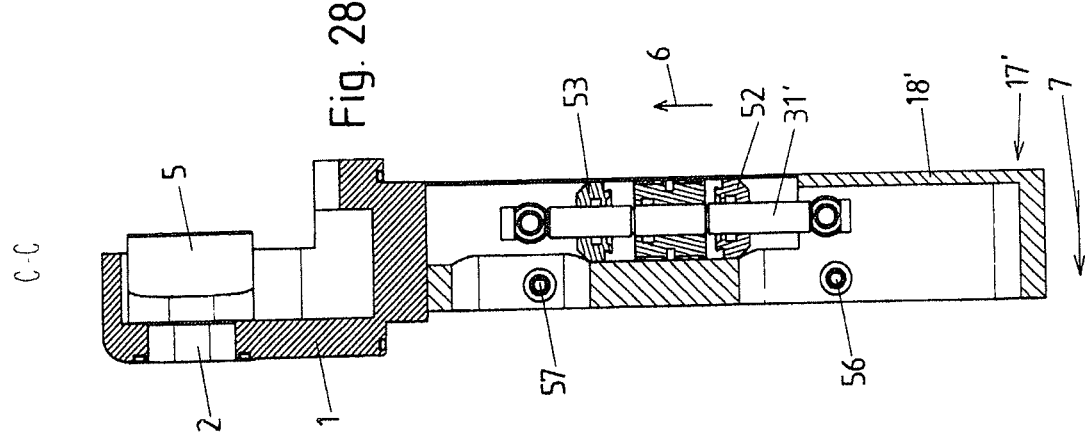
Figure 29:
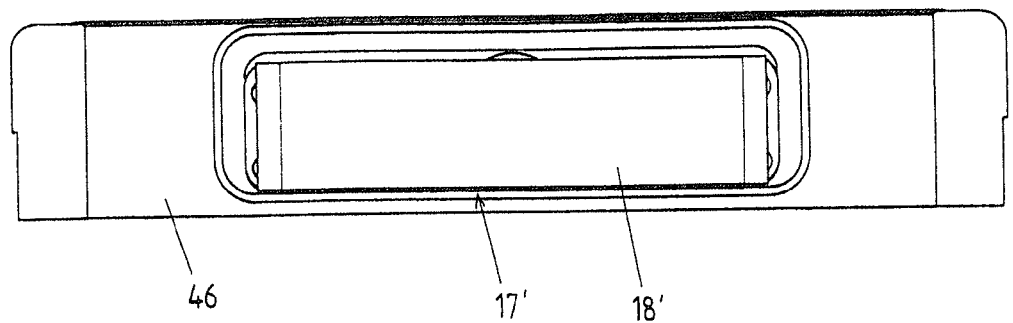
Figure 30:
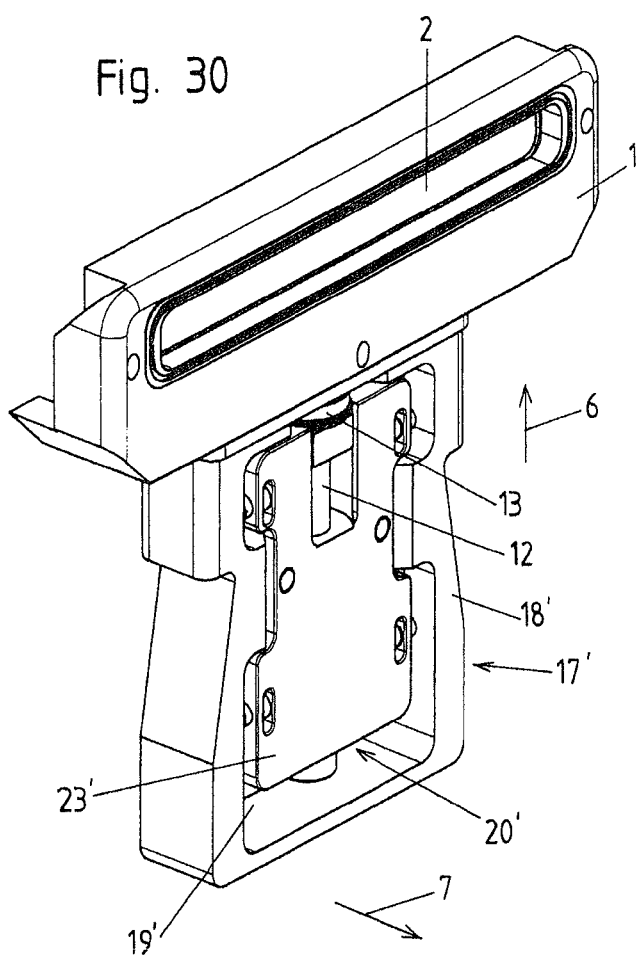

In the variants shown in FIGS. 15 and 16, the valve drive, the valve rod 12, and the valve plate 5 connected to this rod have identical constructions to those shown in FIGS. 1 to 14. The difference of these variants consists merely in that the wall 1 of the vacuum valve having the valve opening 2 is here a part of a vacuum chamber 39 shown only partially and schematically in FIGS. 15 and 16. The valve plate 5 lies within the vacuum chamber 39 that represents a vacuum region of the valve when the vacuum chamber is pumped out. The wall 46 through whose opening the valve rod 12 is led out from the vacuum region of the vacuum chamber 39 is shown in FIGS. 15 and 16 as a separate part that is connected to the vacuum chamber 39 via a flange connection and, indeed, in the region around an opening in the vacuum chamber 39. Thus, by opening this flange connection, the wall 46 could be removed with the valve drive attached to it and with the valve rod and the valve plate 5.

A second embodiment of the invention is described in the following with reference to FIGS. 17 to 34.

Everything that was noted concerning the first embodiment in the first five paragraphs of the description of the first embodiment of the invention (that is, beginning with "A first embodiment of the invention is . . . " after the brief description of the figures) applies identically to the second embodiment and the analogous parts are provided with identical reference symbols.

One difference to the first embodiment initially is that the wall 1 is here not part of a valve housing that is closed—apart from the openings. The vacuum valve is instead constructed as an insert for use in a vacuum chamber 42, as is shown schematically in FIG. 34. The wall 1 thus has, on the side opposite the valve seat 4, an elastic seal 40 surrounding the valve opening 2, in order to seal the wall 1 relative to the wall 41 of the vacuum chamber in the region surrounding an opening 43 of the vacuum chamber 42. The wall 46 that is at a right angle to the wall 1 and through whose opening the valve rod 12 extends, wherein the valve rod 12 is guided vacuum-tight out from the vacuum region of the vacuum valve by the bellows bushing that comprises the bellows 13, has an elastic seal 47 surrounding this opening for sealing the wall 46 relative to the wall 44 of the vacuum chamber in a region surrounding the opening 45 of the wall 44 and the opening 60. A pin 61 for attachment to the vacuum chamber 42 is shown schematically.

Instead of the construction of the vacuum valve in the form of an insert to be used in a vacuum chamber 42, the vacuum valve could have a valve housing that is constructed in an identical form as described in connection with FIGS. 1 to 14. Also, the wall 1 could be part of a vacuum chamber as shown in FIGS. 15 and 16 and described with reference to these figures.

Figure 31:
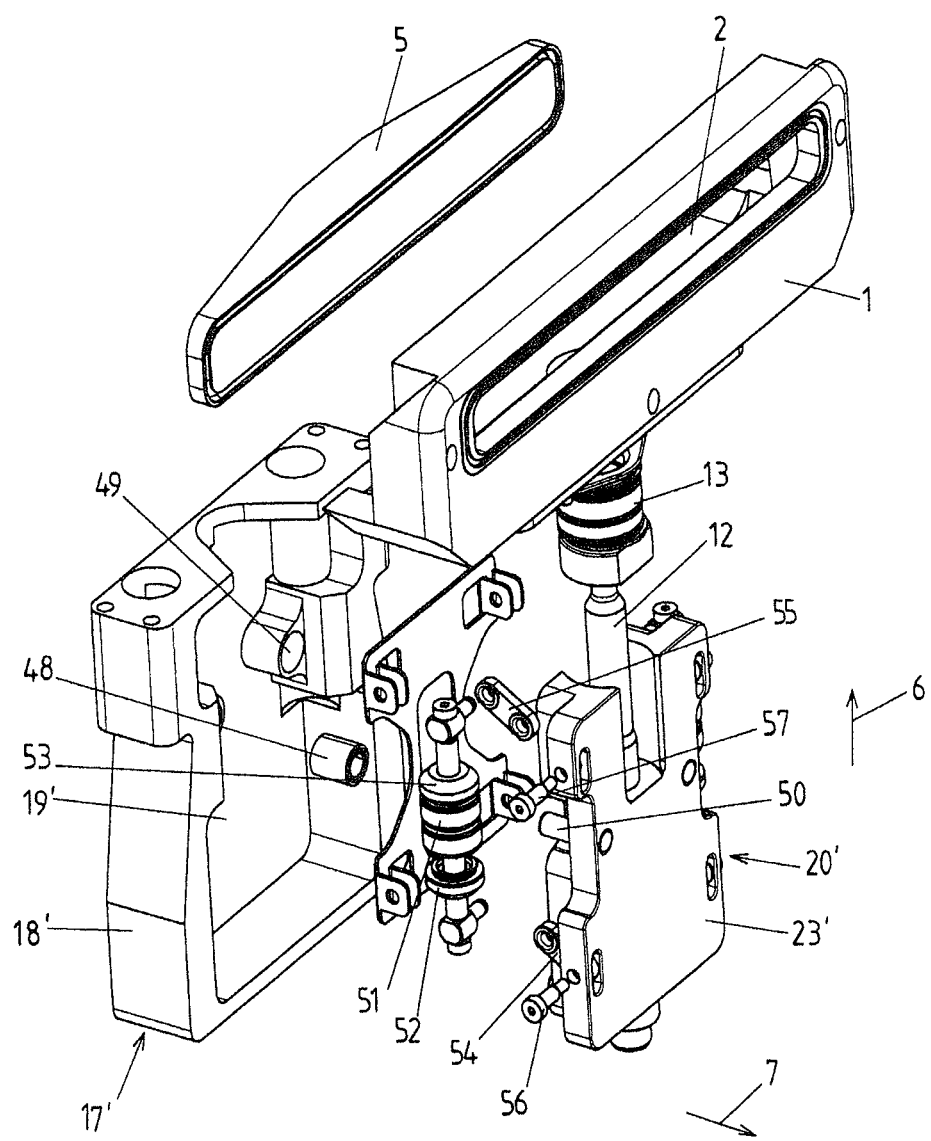
Figure 32:
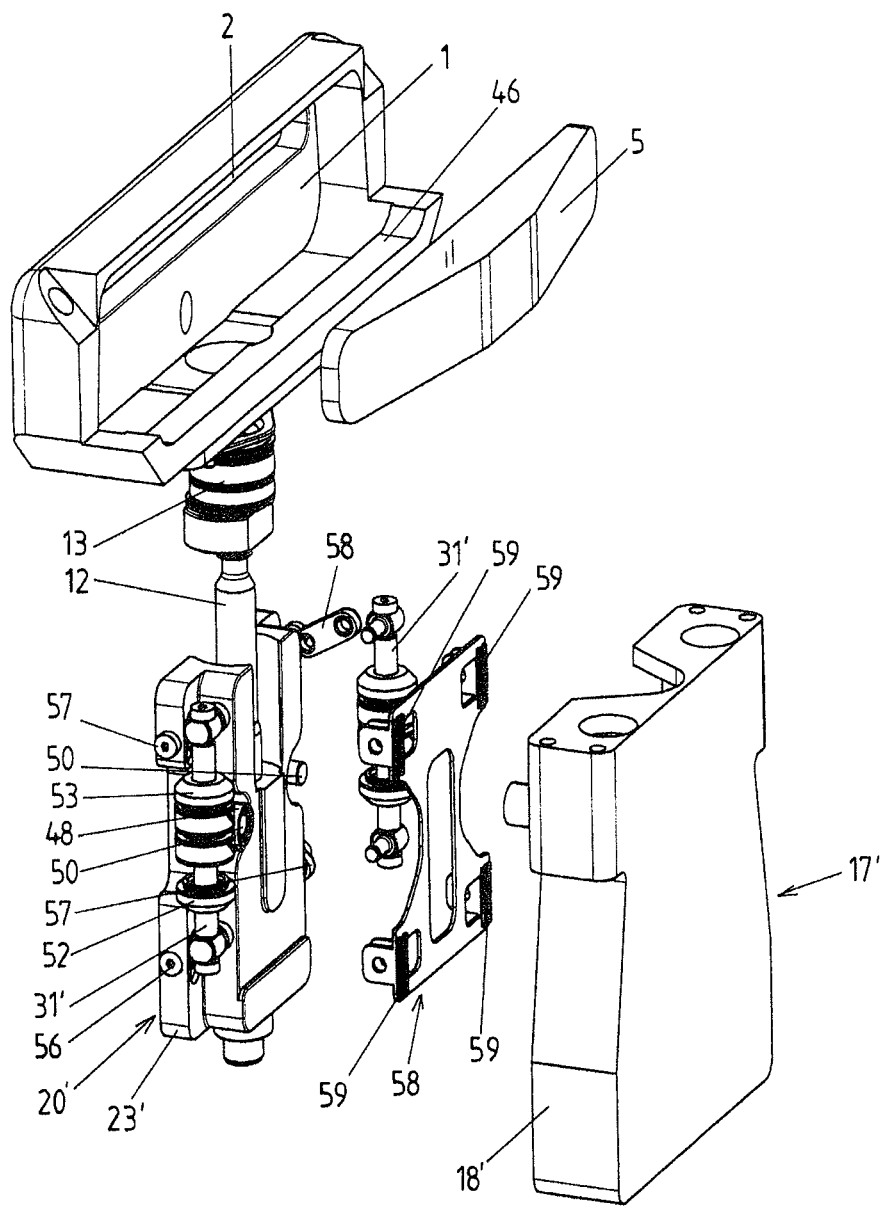
Figure 33:
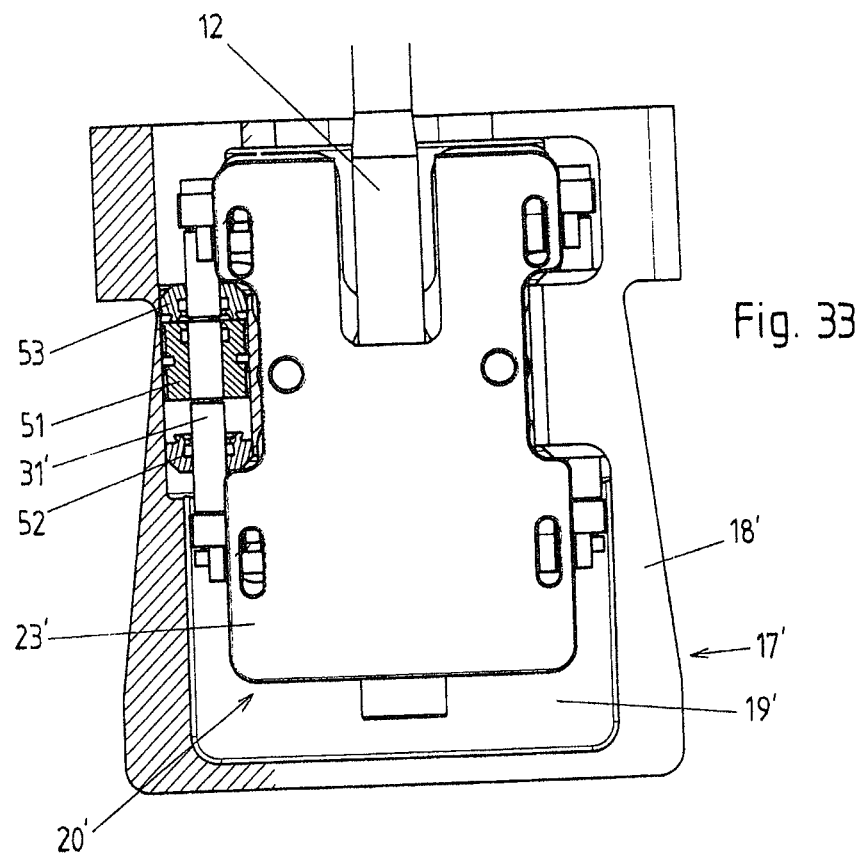

What now follows is a more precise description of the displaceable bearing of the valve rod 12 in the longitudinal and transverse directions 6, 7, as well as the longitudinal and transverse drive devices 15, 16:

A bearing unit 17' connected rigidly to the wall 1 and arranged outside of the vacuum region has a drive housing 18' with a receptacle space 19'. A guide unit 20' holding the valve rod 12 displaceable in the longitudinal direction 6 is arranged in the receptacle space 19' and is guided displaceable in this space by the bearing unit 17' in a straight line in the transverse direction 7. For the displaceable guidance, guide bushings 48 are used that are held in bushing receptacles 49 of the drive housing 18' and project into the guide pins 50 that are attached rigidly to the base body 23' of the guide unit 20' or are constructed integrally with the base body 23'. The guide pins 50 and the axes of the guide bushings 48 lie parallel to the transverse direction. In the illustrated embodiment, two guide bushings 48 are provided that are spaced apart in a direction at a right angle to the transverse direction and at a right angle to the longitudinal direction and are held in bushing receptacles 49 in each of which a guide pin 50 is guided in a displaceable way. In FIG. 31, one of the guide bushings 48 is shown in the state pulled down from the guide pin 50 and pulled out from the guide bushing 48. The other guide bushing is visible in FIG. 32 in the state arranged on the guide pin 50. Also, only one guide pin 50 displaceable in a guide bushing 48 or more than two such displaceable, guided guide pins 50 could be provided.

The longitudinal drive device 15' has, as an actuator, a piston 25' that is arranged in a cylindrical recess 26' constructed in the base body 23' of the guide unit 20'. The piston 25' is arranged on the valve rod 12 that thus forms the piston rod of the piston-cylinder unit of the longitudinal drive device 15'. The cylinder recess 26' is closed on the side facing away from the valve plate-side end of the valve rod 12 by a cylinder cover 24' that is here constructed like a bushing and guides the valve rod 12 in a displaceable way. On the other side of the piston 25', the valve rod 12 is likewise supported by the guide unit 20' displaceable in the longitudinal direction 6 in its region in which it passes through an opening in the base body 23' of the guide unit 20', wherein the longitudinal axis 14 of the valve rod 12 is held parallel to the longitudinal direction 6.

The transverse drive device 16' comprises two drive parts 51 that can be displaced in the longitudinal direction 6 and are constructed, in the illustrated embodiment, in the form of pistons of a corresponding piston-cylinder unit that the actuators of the transverse drive device 16' form. For example, also at least one electromagnetically acting linear drive could be provided as the actuator. The drive parts 51 constructed in the form of pistons are arranged in cylindrical recesses 30' that are arranged in the drive hosing 18' of the bearing unit 17'. The cylindrical recesses 30' are closed on both sides by cylinder covers 52, 53. Instead of a construction of the cylindrical recesses 30' in the drive housing 18', separate cylinders of the bearing unit 17' could also be provided that are connected rigidly to the drive housing 18'. A piston rod 31' projects past a corresponding drive part 51 on both sides and projects on both sides from the cylindrical recess 30'. At the two ends projecting from the cylindrical recess 30', the piston rod 31' is connected to the guide unit 20' by a gear element 54, 55. The gear elements involve connecting rods that are connected, on one hand, in a pivoting way to the piston rod 31' and, on the other hand, in a pivoting way to the bearing unit 17', wherein these pivot axes are aligned at a right angle to the transverse direction 7 and at a right angle to the longitudinal direction 6. For the pivoting connection to the guide unit 20', swivel pins 56, 57 could be provided, as shown, which pass through the bearing recesses into which the gear elements 54, 55 project.

In the open position and in the intermediate position of the valve plate 5, the gear elements 54, 55 are at an angle to the transverse direction 7. Through the longitudinal displacement of the drive parts 51 due to pressurization of the corresponding cylinder space of the cylindrical recess 30' with a pressure medium, advantageously compressed air, the angle to the transverse direction 7 is at least reduced, wherein the guide unit 20' is displaced in the transverse direction 7 relative to the bearing unit 17'.

A displaceable part 58 contacting the bearing unit 17' is used for the transmission of the force to be applied by the transverse drive device in the closed position of the valve plate 5 for pressing the valve plate 5 onto the valve seat 4 to the bearing unit 17'. This is connected to the corresponding piston rods 31' on both sides of the drive part 51, for example, as shown, in the region of the connection of the piston rod 31' to the corresponding gear element 54, 55. The displacement part 58 is thus also displaced by the longitudinal displacement of the drive part 51 relative to the bearing unit 17'. For the displaceable guidance of the displacement part 58 relative to the bearing unit 17', roller bearings 59 are provided. The use of a sliding bearing is also conceivable and possible. By means of the displacement part 58, the piston rod 31' is supported relative to the bearing unit 17' in the closed position of the valve plate 5. The force transmission thus does not have to be performed by the displaceable guidance of the piston rod 31'. It would also be conceivable and possible, however, that the displacement part 58 is eliminated and the force transmission from the piston rod 31' to the bearing unit 17' is performed by the displaceable bearing of the piston rod.

Instead of holding the drive parts 51 constructed in the form of pistons in cylindrical recesses 26 that are constructed in the drive housing 18' of the bearing unit 17', it would also be conceivable and possible to provide separate cylinders connected rigidly to the drive housing 18'.

It would also be conceivable and possible to provide more or less than two drive parts 51 for the transverse drive device 16'.

The gear elements 54, 55 could also be constructed differently in the form of pivoting levers, e.g., for the parallel displacement of the guide unit 20' relative to the bearing unit 17', wedge elements are conceivable and possible.

A spring device that presses the drive parts 51 in one direction is also conceivable and possible.

The longitudinal drive device 15' could also have, as actuators, one or more separate piston-cylinder units whose pistons are connected to the valve rod 12.

Also for the second embodiment, it would be conceivable and possible that the valve rod 12 in the closed position of the valve plate 5 contacts a transverse stop of the bearing unit 17' on a section projecting from guide unit 20' on the side facing away from the valve plate 5. Therefore, in turn, the forces to be applied by the longitudinal and transverse guides against tilting of the valve rod 12 from its alignment parallel to the longitudinal direction 6 could be reduced.

In the first embodiment, as mentioned, a valve body constructed as an insert could also be provided that comprises the wall 1 having the valve opening 2. What was noted concerning FIG. 34 could apply identically to such a variant.

Both in the first (FIGS. 1-16) and also in the second embodiment (FIGS. 17-34), among other things, the following modifications are conceivable and possible:

The elastic seal could also be attached to valve seat 4 and a sealing face interacting with the elastic seal could be provided on the valve plate 5.

More than one valve rod 12 carrying the valve plate 5 could also be provided.

More than one valve plate 5 carried by the one or more valve rods 12 could also be provided.

The pressure medium lines for the differently operated, advantageously pneumatic piston-cylinder units are not described in detail. In part, drill holes that form channels for the pressure medium are visible in the section diagrams. Actuators other than piston-cylinder units could also be used for the longitudinal and/or transverse drive of the vacuum valve.

LEGEND TO THE REFERENCE SYMBOLS

1 Wall
2 Valve opening
3 Axis
4 Valve seat
5 Valve plate
6 Longitudinal direction
7 Transverse direction
8 Valve housing
9 Wall
10 Opening
11 Inner space
12 Valve rod
13 Bellows
14 Longitudinal axis
15, 15' Longitudinal drive device
16, 16' Transverse drive device
17, 17' Bearing unit
18, 18' Drive housing
19, 19' Receptacle space
20, 20' Guide unit
21 Guide bushing
22 Guide bushing
23, 23' Base body
24, 24' Cylinder cover
25, 25' Piston
26, 26' Cylinder recess
27 Piston rod
28 Yoke
29 Piston
30, 30' Cylinder recess
31, 31' Piston rod
32 Coil spring
33 Pressure space
34 Seal
35 Seal
36 Seal
37 Guide bushing
38 Transverse stop
39 Vacuum chamber
40 Seal
41 Wall
42 Vacuum chamber
43 Opening
44 Wall
45 Opening
46 Wall
47 Seal
48 Guide busing
49 Bushing receptacle
50 Guide pin
51 Drive part
52 Cylinder cover
53 Cylinder cover
54 Gear element
55 Gear element
56 Swivel pin
57 Swivel pin
58 Displacement part
59 Roller bearing
60 Opening
61 Bolt

The invention claimed is:

1. Vacuum valve comprising:
a wall with a valve opening that is surrounded by a valve seat, at least one valve plate is arranged in a vacuum region of the vacuum valve and is adjustable from an open position in which the valve opening is open in a longitudinal direction, into an intermediate position in which the valve plate covers the valve opening but is lifted from the valve seat, and from the intermediate position the valve plate is adjustable in a transverse direction at a right angle to the longitudinal direction into a closed position in which the valve plate is pressed onto the valve seat and closes the valve opening,
at least one valve rod carries the valve plate and is guided out from the vacuum region of the vacuum valve and is displaceable relative to the wall in the longitudinal direction lying parallel to the longitudinal axis of the valve rod, and also can be displaced parallel and relative to the wall in the transverse direction,
a longitudinal drive device is arranged outside of the vacuum region of the vacuum valve by which the valve rod can be displaced in the longitudinal direction for adjusting the valve plate between the open position and the intermediate position, and
a transverse drive device is arranged outside of the vacuum region of the vacuum valve by which the valve rod can be displaced parallel and in the transverse direction for adjusting the valve plate between the intermediate position and the closed position,
a bearing unit lies outside of the vacuum region of the vacuum valve and is connected rigidly to the wall by which a guide unit that guides the valve rod displaceable in the longitudinal direction is guided in a displaceable manner in the transverse direction, and
in the closed position of the valve plate, a section of the valve rod is supported on a transverse stop, and said section projects from the guide unit on a side facing away from the valve plate.

2. Vacuum valve according to claim 1, wherein the bearing unit has sections lying on both sides of the guide unit with respect to the longitudinal direction.

3. Vacuum valve according to claim 2, wherein the guide unit is arranged at least partially in a receptacle space of the bearing unit and is guided in a displaceable manner in the bearing unit in the transverse direction.

4. Vacuum valve according to claim 1, wherein a spring device is provided between the guide unit and the bearing unit for pressurization of the guide unit in the transverse direction.

5. Vacuum valve comprising:
- a wall with a valve opening that is surrounded by a valve seat, at least one valve plate is arranged in a vacuum region of the vacuum valve and is adjustable from an open position in which the valve opening is open in a longitudinal direction, into an intermediate position in which the valve plate covers the valve opening but is lifted from the valve seat, and from the intermediate position the valve plate is adjustable in a transverse direction at a right angle to the longitudinal direction into a closed position in which the valve plate is pressed onto the valve seat and closes the valve opening,
- at least one valve rod carries the valve plate and is guided out from the vacuum region of the vacuum valve and is displaceable relative to the wall in the longitudinal direction lying parallel to the longitudinal axis of the valve rod, and also can be displaced parallel and relative to the wall in the transverse direction,
- a longitudinal drive device that comprises at least one piston that is connected to the valve rod and is arranged in a cylindrical recess that is constructed in a guide unit, the longitudinal drive device being arranged outside of the vacuum region of the vacuum valve by which the valve rod can be displaced in the longitudinal direction for adjusting the valve plate between the open position and the intermediate position, and
- a transverse drive device is arranged outside of the vacuum region of the vacuum valve by which the valve rod can be displaced parallel and in the transverse direction for adjusting the valve plate between the intermediate position and the closed position,
- a bearing unit lies outside of the vacuum region of the vacuum valve and is connected rigidly to the wall by which the guide unit that guides the valve rod displaceable in the longitudinal direction is guided in a displaceable manner in the transverse direction.

6. Vacuum valve according to claim 5, wherein the valve rod is guided in a displaceable manner by the guide unit on both sides of the piston of the longitudinal drive device.

7. Vacuum valve comprising:
- a wall with a valve opening that is surrounded by a valve seat, at least one valve plate is arranged in a vacuum region of the vacuum valve and is adjustable from an open position in which the valve opening is open in a longitudinal direction, into an intermediate position in which the valve plate covers the valve opening but is lifted from the valve seat, and from the intermediate position the valve plate is adjustable in a transverse direction at a right angle to the longitudinal direction into a closed position in which the valve plate is pressed onto the valve seat and closes the valve opening,
- at least one valve rod carries the valve plate and is guided out from the vacuum region of the vacuum valve and is displaceable relative to the wall in the longitudinal direction lying parallel to the longitudinal axis of the valve rod, and also can be displaced parallel and relative to the wall in the transverse direction,
- a longitudinal drive device is arranged outside of the vacuum region of the vacuum valve by which the valve rod can be displaced in the longitudinal direction for adjusting the valve plate between the open position and the intermediate position, and
- a transverse drive device that has at least one piston is arranged in a cylindrical recess that is constructed in a guide unit, the transverse drive device being arranged outside of the vacuum region of the vacuum valve by which the valve rod can be displaced parallel and in the transverse direction for adjusting the valve plate between the intermediate position and the closed position,
- a bearing unit lies outside of the vacuum region of the vacuum valve and is connected rigidly to the wall by which the guide unit that guides the valve rod displaceable in the longitudinal direction is guided in a displaceable manner in the transverse direction, and
- a force applied by the transverse drive device for displacement of the valve rod in the transverse direction acts on the valve rod via the guide unit and displaces the guide unit while carrying along the valve rod (12) in the transverse direction relative to the bearing unit.

8. Vacuum valve according to claim 7, wherein a pressure space for pressurization of the guide unit in the transverse direction by a pressure medium introduced into the pressure space is provided between the guide unit and the bearing unit.

9. Vacuum valve according to claim 7, wherein the transverse drive device has at least one drive part that is displaceable in the longitudinal direction and is connected to the guide unit via at least one gear element.

10. Vacuum valve according to claim 9, wherein for the parallel displacement of the guide unit in the transverse direction, the at least one drive part is connected to the guide unit via corresponding ones of the gear elements on opposite sides of the drive part with respect to the longitudinal direction.

11. Vacuum valve according to claim 10, wherein the gear elements are formed by connecting rods connected in a pivoting fashion to the guide unit and in a pivoting fashion to the drive part or to a part connected rigidly to the drive part.

* * * * *